US009792699B2

(12) United States Patent
Ikemoto et al.

(10) Patent No.: US 9,792,699 B2
(45) Date of Patent: Oct. 17, 2017

(54) BANKNOTE PROCESSING APPARATUS AND BANKNOTE PROCESSING METHOD

(71) Applicant: GLORY LTD., Himeji-shi, Hyogo (JP)

(72) Inventors: Ryo Ikemoto, Himeji (JP); Akira Bogaki, Himeji (JP); Satoru Oshima, Himeji (JP)

(73) Assignee: GLORY LTD., Himeji-shi, Hyogo (JP)

( * ) Notice: Subject to any disclaimer, the term of this patent is extended or adjusted under 35 U.S.C. 154(b) by 198 days.

(21) Appl. No.: 14/606,142

(22) Filed: Jan. 27, 2015

(65) Prior Publication Data

US 2015/0213620 A1    Jul. 30, 2015

(30) Foreign Application Priority Data

Jan. 27, 2014  (JP) ................................ 2014-012275

(51) Int. Cl.
H04N 7/18    (2006.01)
G01N 21/00   (2006.01)
(Continued)

(52) U.S. Cl.
CPC ............ *G06T 7/408* (2013.01); *G06T 7/0002* (2013.01); *G06T 7/90* (2017.01); *G07D 7/121* (2013.01);
(Continued)

(58) Field of Classification Search
CPC ................................ H04N 7/18; G01N 21/88
See application file for complete search history.

(56) References Cited

U.S. PATENT DOCUMENTS 6,970,235 B2    11/2005   Christophersen
8,749,767 B2     6/2014   Parkov et al.
(Continued)

FOREIGN PATENT DOCUMENTS

EP    0 718 808 A2    6/1996
EP    1 785 951 A1    5/2007
(Continued)

OTHER PUBLICATIONS

European Search Report (Application No. 15151898.2) (8 pages—dated Jun. 24, 2015).
(Continued)

Primary Examiner — Behrooz Senfi
Assistant Examiner — Maryam Nasri
(74) Attorney, Agent, or Firm — Renner, Kenner, Greive, Bobak, Taylor & Weber

(57) ABSTRACT

A banknote is irradiated with lights of plural wavelengths. Images of the banknote for each wavelength are acquired. An IR ratio image having a pixel value that is a ratio of a pixel value of the image acquired by the visible light to a corresponding pixel value of the image acquired by the infrared light is generated. The banknote image and the IR ratio image are corrected by a coefficient corresponding to the banknote type, the banknote orientation, and the wavelength. From the banknote image or the IR ratio image, by using the information pertaining to the banknote type, the banknote orientation, and the wavelength, intermediate evaluation values are calculated for each wavelength. Mahalanobis distance is calculated based on the intermediate evaluation values, an average value and a variance-covariance matrix of the intermediate evaluation values, and a degree of soiling is determined based on the Mahalanobis distance.

9 Claims, 12 Drawing Sheets

(51) Int. Cl.
*H04N 5/00* (2011.01)
*G06T 7/40* (2017.01)
*G07D 7/187* (2016.01)
*G06T 7/00* (2017.01)
*H04N 5/225* (2006.01)
*H04N 5/30* (2006.01)
*G07D 7/121* (2016.01)
*G06T 7/90* (2017.01)
*G07D 7/1205* (2016.01)
*G07D 7/17* (2016.01)

(52) U.S. Cl.
CPC ............ *G07D 7/1205* (2017.05); *G07D 7/17* (2017.05); *G07D 7/187* (2013.01); *H04N 5/2256* (2013.01); *H04N 5/30* (2013.01); *G06T 2207/10152* (2013.01); *G06T 2207/30168* (2013.01)

(56) References Cited

U.S. PATENT DOCUMENTS

| | | |
|---|---|---|
| 8,780,206 B2 | 7/2014 | Blair |
| 2006/0251320 A1 | 11/2006 | Diederichs et al. |
| 2007/0092110 A1* | 4/2007 | Xu ........................ G06T 7/2033 382/103 |
| 2010/0102234 A1* | 4/2010 | Hamasaki ............. G07D 7/121 250/341.7 |
| 2010/0230231 A1* | 9/2010 | Uesaka .................... G07D 9/02 194/206 |
| 2011/0052082 A1* | 3/2011 | Parkov ................ G06K 9/2018 382/209 |
| 2011/0064279 A1 | 3/2011 | Uno |
| 2011/0229696 A1 | 9/2011 | Ratnukumar et al. |
| 2013/0044935 A1 | 2/2013 | Minin et al. |

FOREIGN PATENT DOCUMENTS

| | | |
|---|---|---|
| RU | 2 436 165 C2 | 12/2011 |
| RU | 2 438 182 C1 | 12/2011 |

OTHER PUBLICATIONS

Russian Office Action (Application No. 2015102328) (7 pages dated Mar. 3, 2016).

* cited by examiner

FIG.7

IMAGE DATA  64a

| IMAGE NUMBER | IMAGE ACQUIRING SENSOR CATEGORY | LIGHT SOURCE TYPE | ACQUIRED IMAGE DATA |
|---|---|---|---|
| 1 | FIRST-SIDE | REFLECTIVE RED LIGHT | ... |
| 2 | FIRST-SIDE | REFLECTIVE GREEN LIGHT | ... |
| 3 | FIRST-SIDE | REFLECTIVE VIOLET LIGHT | ... |
| 4 | FIRST-SIDE | REFLECTIVE INFRARED LIGHT | ... |
| 5 | FIRST-SIDE | TRANSMISSIVE RED LIGHT | ... |
| 6 | FIRST-SIDE | TRANSMISSIVE GREEN LIGHT | ... |
| 7 | FIRST-SIDE | TRANSMISSIVE VIOLET LIGHT | ... |
| 8 | FIRST-SIDE | TRANSMISSIVE INFRARED LIGHT | ... |
| 9 | OPPOSITE-SIDE | REFLECTIVE RED LIGHT | ... |
| 10 | OPPOSITE-SIDE | REFLECTIVE GREEN LIGHT | ... |
| 11 | OPPOSITE-SIDE | REFLECTIVE VIOLET LIGHT | ... |
| 12 | OPPOSITE-SIDE | REFLECTIVE INFRARED LIGHT | ... |

EVALUATION VALUE DATA  64c

| BANKNOTE DETERMINATION RESULT | COUNTRY | JAPAN |
|---|---|---|
| | DENOMINATION | 10,000 YEN |
| | ORIENTATION | A |
| SOILING DETERMINATION RESULT | | NOT UNFIT BANKNOTE |
| FINAL EVALUATION VALUE | | Y |
| NUMBER OF INTERMEDIATE EVALUATION VALUES | | 6 |
| INTERMEDIATE EVALUATION VALUES (1) | | 31.5 |
| INTERMEDIATE EVALUATION VALUES (2) | | 28.7 |
| INTERMEDIATE EVALUATION VALUES (3) | | 25.5 |
| INTERMEDIATE EVALUATION VALUES (4) | | 14.7 |
| INTERMEDIATE EVALUATION VALUES (5) | | 11.2 |
| INTERMEDIATE EVALUATION VALUES (6) | | 14.0 |
| ⋮ | | ⋮ |

FIG.8

BANKNOTE TYPE-WISE REFERENCE DATA 64b

| COUNTRY | DENOMI-NATION | ORIENTA-TION | INTERMEDIATE EVALUATION VALUE CALCULATION PARAMETERS ||||||| FINAL EVALUATION VALUE CALCULATION PARAMETER || DETERMI-NATION THRESH-OLD VALUE |
|---|---|---|---|---|---|---|---|---|---|---|---|
| | | | USED IMAGE NUMBER || DETERMINATION AREAS | CALCULATION METHOD | IR RATIO TO BE USED OR NOT | COEFFI-CIENT | AVERAGE VALUE | VARIANCE-COVARIANCE MATRIX | |
| | | | FIRST IMAGE (g1) | SECOND IMAGE (g2) | | | | | | | |
| JAPAN | 10,000 YEN | A | 1 | 9 | (2,3),(2,4),(2,5)... | g1+g2 | USE | a | μ1 | S | x |
| | | | 2 | 10 | ... | g1+g2 | USE | b | μ2 | | |
| | | | 3 | 11 | ... | g1+g2 | USE | c | μ3 | | |
| | | | 5 | - | ... | - | USE | d | μ4 | | |
| | | | 6 | - | ... | - | USE | e | μ5 | | |
| | | | 7 | - | ... | - | USE | f | μ6 | | |
| | | B | | | | | | | | | |
| | 5,000 YEN | C | | | | | | | | | |
| | 1,000 YEN | D | | | | | | | | | |
| ... | ... | ... | ... | ... | ... | ... | ... | ... | ... | ... | ... |

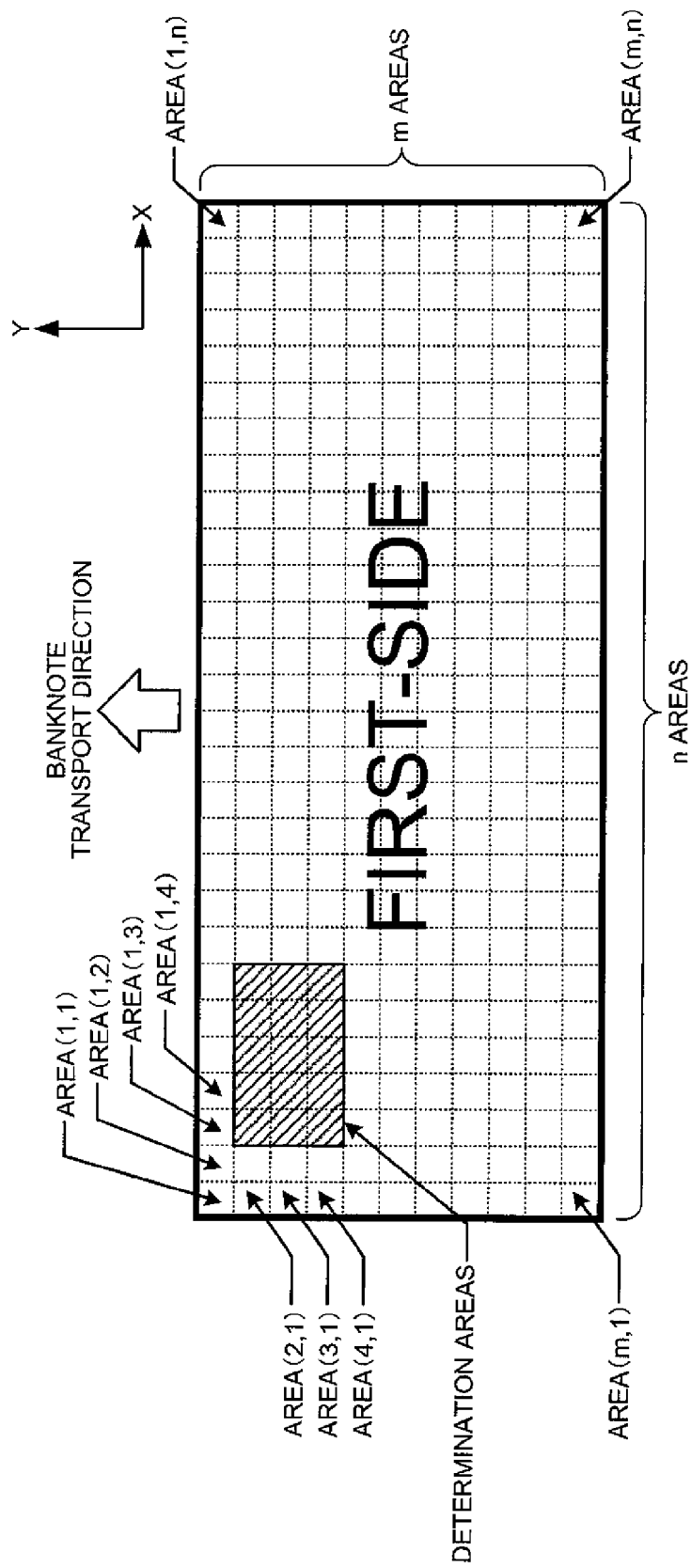

FIG.11A

SETTING EXAMPLE OF INTERMEDIATE EVALUATION VALUE CALCULATION PARAMETERS

64b

| INTERMEDIATE EVALUATION VALUE CALCULATION PARAMETERS ||||||
|---|---|---|---|---|---|
| USED IMAGE NUMBER || DETERMINATION AREAS | CALCULATION METHOD | IR RATIO TO BE USED OR NOT | COEFFICIENT |
| FIRST IMAGE(g1) | SECOND IMAGE(g2) | | | | |
| 1 | - | (2,3),(2,4),(2,5)... | - | USE | a |
| 2 | 10 | ... | g1+g2 | USE | b |
| 3 | 11 | (2,3),(2,4),(2,5)... | g1+g2 | USE | c |
| 5 | - | ... | - | NOT USE | d |
| 6 | - | ... | - | NOT USE | e |
| 7 | - | (6,4),(6,5),(6,6)... | - | NOT USE | f |

- FIRST INTERMEDIATE EVALUATION VALUE → (row 1)
- SECOND INTERMEDIATE EVALUATION VALUE → (row 2)
- THIRD INTERMEDIATE EVALUATION VALUE → (row 3)
- SIXTH INTERMEDIATE EVALUATION VALUE → (row 7)

FIG.11B

WHEN "IR RATIO TO BE USED OR NOT" IS "USE"

$$\text{INTERMEDIATE EVALUATION VALUE OF FIRST DETERMINATION AREA } (=x1) = \sum_{i=1}^{n1} f1(i)/f4(i) \times a$$

※ fj(i) : PIXEL VALUE OF i-TH DETERMINATION AREA OF IMAGE NUMBER j
n1 : THE NUMBER OF AREAS OF DETERMINATION AREA CORRESPONDING TO THE FIRST INTERMEDIATE EVALUATION VALUE

FIG.11C

WHEN "IR RATIO TO BE USED OR NOT" IS "USE" AND TWO IMAGES ARE SET $$\text{INTERMEDIATE EVALUATION VALUE OF THIRD DETERMINATION AREA } (=x3) = \sum_{i=1}^{n3} \{f3(i)/f4(i) + f11(i)/f12(i)\} \times c$$

※ fj(i) : PIXEL VALUE OF i-TH DETERMINATION AREA OF IMAGE NUMBER j
n3 : THE NUMBER OF AREAS OF DETERMINATION AREA CORRESPONDING TO THE THIRD INTERMEDIATE EVALUATION VALUE

FIG.11D

WHEN "IR RATIO TO BE USED OR NOT" IS "NOT USE"

$$\text{INTERMEDIATE EVALUATION VALUE OF SIXTH DETERMINATION AREA } (=x6) = \sum_{i=1}^{n6} f7(i) \times f$$

※ fj(i) : PIXEL VALUE OF i-TH DETERMINATION AREA OF IMAGE NUMBER j
n6 : THE NUMBER OF AREAS OF DETERMINATION AREA CORRESPONDING TO THE SIXTH INTERMEDIATE EVALUATION VALUE

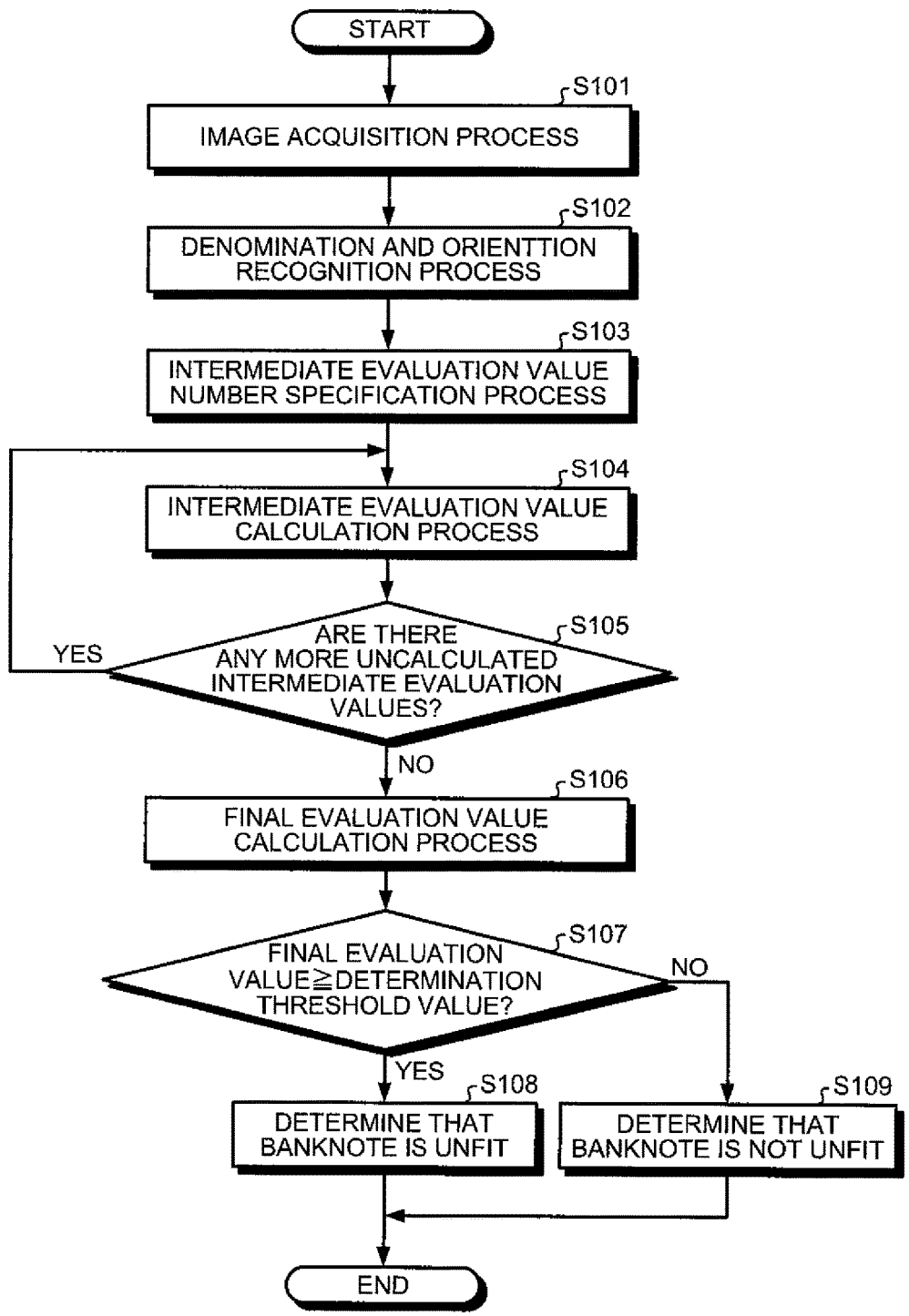

BANKNOTE PROCESSING APPARATUS AND BANKNOTE PROCESSING METHOD

BACKGROUND OF THE INVENTION

1. Field of the Invention

The present invention relates to a banknote processing apparatus and a banknote processing method for checking degree of soiling for various kinds of banknotes issued by a plurality of countries.

2. Description of the Related Art

Conventionally, irradiating a paper sheet with a visible light, and determining the degree of soiling of a paper sheet based on an image data of the paper sheet obtained by reflected light received from the paper sheet is a known technology. For example, Japanese Patent Application Laid-open No. 2010-277252 discloses the following technology in which visible light is irradiated on a paper sheet, an image of the paper sheet is obtained by receiving the reflected light from the paper sheet, and the degree of soiling is determined by comparing, for a low-contrast and bright area selected beforehand for checking the degree of soiling, a reference value calculated beforehand for a reference paper sheet based on a pixel value of area of the standard paper sheet of the same type for detecting a degree of soiling and an evaluation value calculated based on a pixel value of the target paper sheet to be checked. The degree of soiling of a banknote can be determined by applying the technology disclosed in Japanese Patent Application Laid-open No. 2010-277252 to a banknote processing apparatus.

However, often there is inconsistency between the results of checking the degree of soiling of the banknote by the banknote processing apparatus that employs the technology disclosed in Japanese Patent Application Laid-open No. 2010-277252 and that of visual observation of the degree of soiling. Furthermore, often a different checking result is obtained each time even if the degree of soiling of the same banknote is checked plural times by the banknote processing apparatus to which the technology disclosed in Japanese Patent Application Laid-open No. 2010-277252 is applied. It is also difficult to determine the degree of soiling of a large variety of banknotes issued by several countries on one unit of the banknote processing apparatus to which the technology disclosed in Japanese Patent Application Laid-open No. 2010-277252 is applied.

The inconsistency with the visual perception of degree of soiling checking result and variation of results of the checking of degree of soiling performed for the same banknote plural times would engender a feeling of distrust toward the banknote processing apparatus to the apparatus users. In a banknote processing apparatus intended to be used in overseas market, an identifying soiling needs to be performed for a large variety of banknotes issued by several countries. To make a banknote processing apparatus realize that the apparatus users can rely on and that can be used for overseas market expansion, it is important that the result of the degree of soiling checking by the apparatus is consistent with that of the visual perception of the degree of soiling, the variation of the results of the degree of soiling checking for the same paper sheet multiple times is reduced, and the banknote processing apparatus is capable of performing the degree of soiling checking for a large variety of banknotes.

SUMMARY OF THE INVENTION

It is an object of the present invention to address the above problems, and to provide a banknote processing apparatus and a banknote processing method for improving the reliability of degree of soiling determination of banknotes and enabling degree of soiling determination for a large variety of banknotes.

To solve the above problems and to achieve the above object, according to an aspect of the present invention, a banknote processing apparatus that performs an unfit note determination that is a determination of a degree of soiling of a banknote being transported, and performs sorting in accordance with a determination result, includes a banknote receiving unit that receives the banknote; a transport unit that transports the banknote received by the banknote receiving unit to one of plural output destination units; an image acquiring unit that, during the transportation of the banknote by the transport unit, irradiates the banknote with lights of plural wavelengths, and based on received light data of at least one of a reflected light that is reflected by the banknote and a transmitted light that passes through the banknote, acquires an image of the banknote for the light of each wavelength that is irradiated; an identifying unit that identifies a type of the banknote received by the banknote receiving unit and a banknote orientation that refers to an orientation of the banknote relative to a transport direction in which the transport unit transports the banknote; and an unfit note determining unit that applies a coefficient to the images acquired by the image acquiring unit according to an identification result of the identification unit and the wavelengths of the lights used for irradiation, and performs an unfit note determination that refers to a degree of soiling determination.

According to another aspect of the present invention, a banknote processing method for performing an unfit note determination that is a determination of a degree of soiling of a banknote being transported and sorting in accordance with a determination result, includes receiving the banknote; transporting the banknote received at the receiving; acquiring, based on received light data of at least one of a reflected light that is reflected by the banknote and a transmitted light that passes through the banknote, an image for a light of each wavelength that is irradiated, by irradiating the banknote received at the receiving with the lights of plural wavelengths; identifying a type of the banknote received at the receiving and a banknote orientation that refers to an orientation of the banknote relative to a transport direction at transporting; determining an unfit note by determining a degree of soiling by applying to the images acquired at acquiring a coefficient according to an identification result obtained at the identifying and the wavelengths of the lights used for irradiation; and transporting the banknote to any one of plural output destination units in accordance with an unfit note determination result obtained at the determining.

The above and other objects, features, advantages and the technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is one drawing (part 1) for explaining a data structure according to the embodiment of the banknote processing apparatus shown in FIG. 2.

FIG. 8 is another drawing (part 2) for explaining the data structure according to the embodiment of the banknote processing apparatus shown in FIG. 2.

FIG. 10 is a drawing for explaining a defining method of determination areas included in the banknote type-wise reference data shown in FIG. 8.

FIG. 11A shows a setting example of the intermediate evaluation value calculation parameters of the banknote type-wise reference data.

FIG. 11B shows the calculation formula for the first intermediate evaluation value.

FIG. 11C shows the calculation formula for the third intermediate evaluation value.

FIG. 11D shows the calculation formula for the sixth intermediate evaluation value.

FIG. 12 is a flowchart of a process procedure of a degree of soiling determination process of the banknote according to the present embodiment performed by the banknote processing apparatus shown in FIG. 2.

DETAILED DESCRIPTION

Exemplary embodiments of a banknote processing apparatus and a banknote processing method according to the present invention are explained in detail below with reference to the accompanying drawings.

Figure 1:
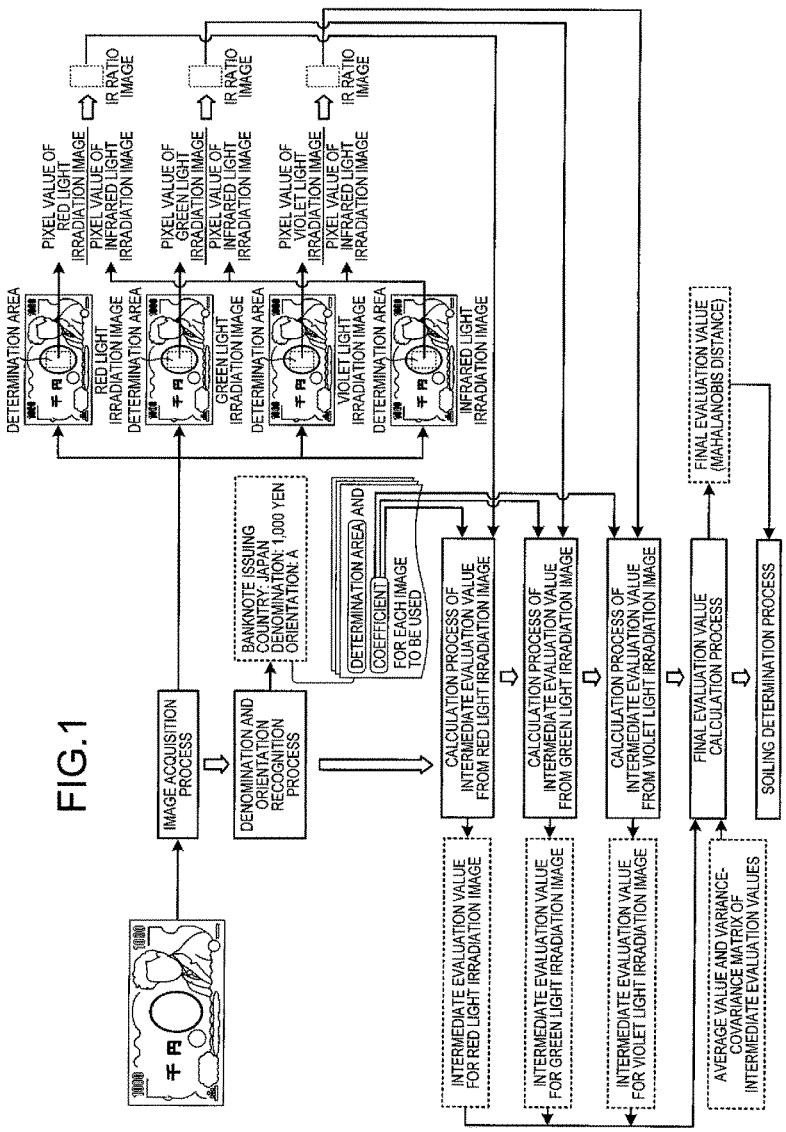
FIG. 1 is a drawing for explaining an overview of a degree of soiling determination process of a banknote performed by a banknote processing apparatus according to an embodiment of the present invention.

FIG. 1 is a drawing for explaining an overview of a determination process of degree of soiling of a banknote by a banknote processing apparatus 10 according to an embodiment of the present invention.

The banknote inputted into the banknote processing apparatus 10 is irradiated with a red light, a green light, a violet light, and an infrared light. The images of the banknote by the irradiation with each of the above lights are obtained. A banknote issuing country, a banknote denomination, and a banknote orientation are recognized based on the obtained images of the inputted banknote. The banknote processing apparatus 10 holds therein, for each of the banknote issuing country, the banknote denomination, and the banknote orientation for the inputted banknote, image types to be used for soiling determination, determination areas to be used for soiling determination for each of the image types, and coefficients for calculating intermediate evaluation values to be used for soiling determination for each of the image types. Based on the above information, and depending on the banknote issuing country, the banknote denomination, and the orientation of the inputted banknote recognized in the above denomination and orientation recognition process, the banknote processing apparatus 10 identifies the image types to be used for soiling determination, the determination areas to be used for soiling determination for each of the image types, and the coefficients for calculating the intermediate evaluation values to be used for soiling determination for each of the image types corresponding to the inputted banknote.

The banknote processing apparatus 10 then calculates the intermediate evaluation values for the image obtained by the red light irradiation, the intermediate evaluation values for the image obtained by the green light irradiation, and the intermediate evaluation values for the image obtained by violet light irradiation, by using the images obtained in the above image obtaining process, the image types determined in the denomination and orientation recognition process in order to be used for a soiling determination, the determination areas to be used for soiling determination for each of the image types, and the coefficients with which the intermediate evaluation values is calculated to obtain soiling determination for each of the image types.

A method of calculating the intermediate evaluation values for the image obtained by the red light irradiation is explained next. An IR ratio image of the red light irradiation image corresponding to the determination area is generated by calculating a ratio of a value of pixels of the determination area of the red light irradiation image to a value of pixels present in the same position in the infrared light irradiation image for all the pixels present in the determination area. The intermediate evaluation value for the red light irradiation image can be calculated by summing the pixel values of all the pixels present in the IR ratio image of the red light irradiation image and multiplying the obtained sum by the coefficient. The intermediate evaluation values for the green light irradiation image and the violet light irradiation image can also be calculated in a similar manner.

The degree of soiling of the banknote has little impact on an infrared light irradiation image, and therefore, the influence of variation in the pixel values that is caused from the positional relationship between the banknote, the light source, and the sensor can be reduced by using the IR ratio image. The coefficient that is determined for each image is used for correcting the difference between the pixel value levels that are caused from the optical properties of the test target banknote depending on the types of the visible lights. That is, using the IR ratio image is effective in that, when degree of soiling is determined on the same banknote, there is a reduction of the variation in the determination results that is caused due to the positional relationship between the banknote, the light source, and the sensor. When the coefficient determined for each image is corrected based on the difference in the pixel value level that is caused depending on the type of the visible light in accordance with the optical properties of the test target banknote, it is effective that the result of soiling determination matching the result of soiling determination by visual perception can be obtained.

The banknote processing apparatus 10 beforehand calculates for each of the banknote types and the banknote orientations for a sufficient number of banknotes, the intermediate evaluation values for the red light irradiation images, the intermediate evaluation values for the green light irradiation images, and the intermediate evaluation values for the violet light irradiation images, and stores therein in advance, the average value and a variance-covariance matrix of the calculated intermediate evaluation values. By using these average values and the variance-covariance matrix of the intermediate evaluation values, and the intermediate evaluation values for the test target banknote, the banknote processing apparatus 10 calculates a Mahalanobis distance of the intermediate evaluation value for the test target banknote as the final evaluation value. The banknote processing apparatus 10 then determines the degree of soiling of the test target banknote by comparing the Mahalanobis distance with a determination threshold value that is previously set for each of the banknote types and the banknote orientations.

In this manner, the banknote is irradiated with the red light, the green light, the violet light, and the infrared light and the reflected light from the banknote is received. The image for the wavelength of each irradiating light is obtained, and the banknote issuing country, the banknote denomination, and the banknote orientation are recognized based on the obtained images. Furthermore, the ratio image that has a pixel value that is a ratio of the pixel value of the received-light data received by irradiation with the visible light to the pixel value of the received-light data received by irradiation with the infrared light is generated. The intermediate evaluation values are further calculated for respective wavelengths of the irradiating lights based on the information pertaining to the banknote issuing country, the banknote denomination, and the banknote orientation, the coefficient corresponding to the wavelength of the irradiating visible light, and the generated ratio image. The Mahalanobis distance for the intermediate evaluation values of the test target banknote is calculated based on the calculated intermediate evaluation values, the average value of the intermediate evaluation values, and the variance-covariance matrix; the degree of soiling is determined based on this Mahalanobis distance. Consequently, the reliability of the degree of soiling determination of the banknote can be improved and the degree of soiling determination can be performed for a large variety of banknotes.

Figure 2:
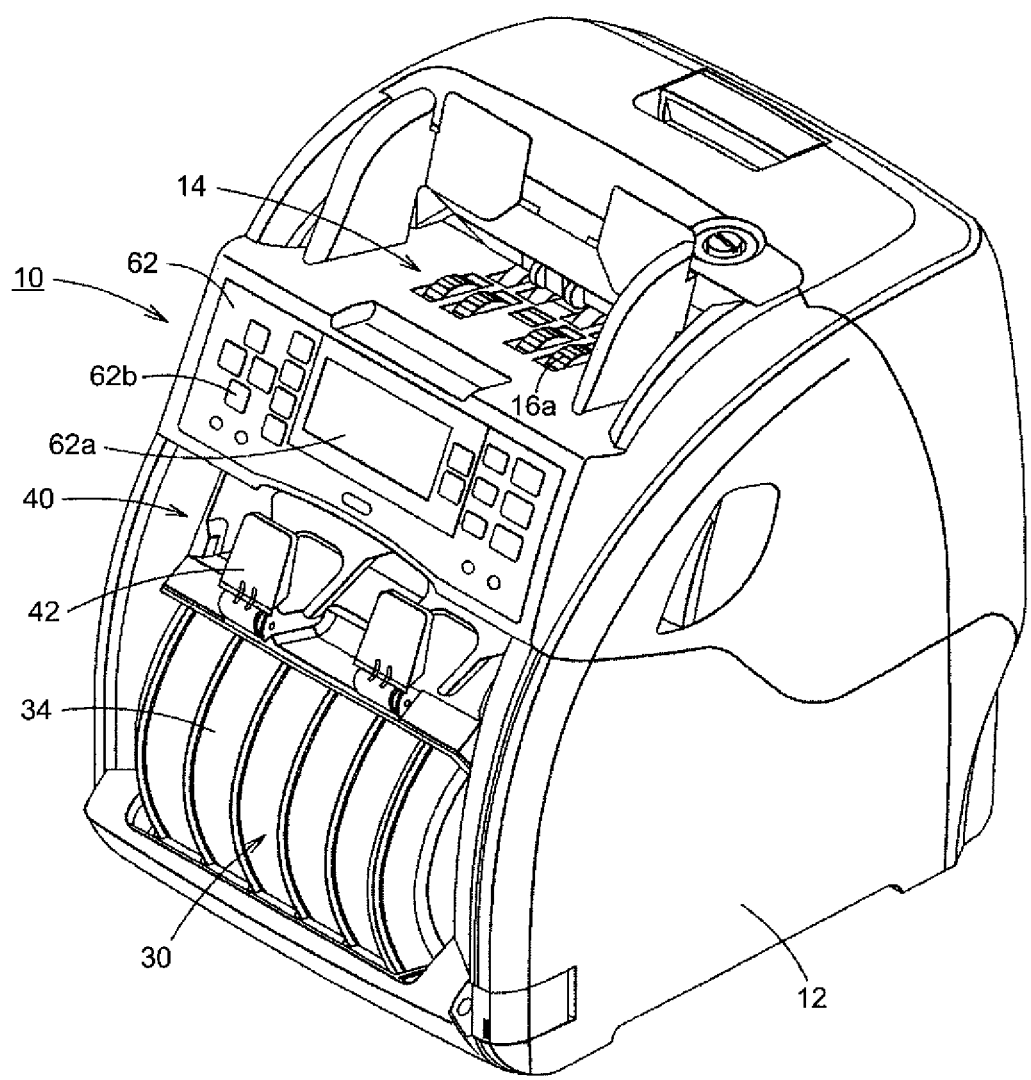
FIG. 2 is a drawing of an exterior structure of the banknote processing apparatus according to the present embodiment.

An exterior structure of the banknote processing apparatus 10 according to the present embodiment is explained next. FIG. 2 is a drawing of the exterior structure of the banknote processing apparatus 10 according to the present embodiment.

As shown in FIG. 2, a housing 12 covers an inner apparatus structure of the banknote processing apparatus 10. A front face of the banknote processing apparatus 10 includes a feeding hopper 14 for placing plural banknotes to be identified and counted in a stacked manner, an operating and display unit 62 that displays a processing status of the banknote processing apparatus 10 and that can be operated for issuing instructions for banknote processing, a reject unit 40 where the banknotes that are determined to be not genuine or unfit are conveyed, and a stacking unit 30 where the banknotes that has been determined to be genuine are conveyed.

As shown in FIG. 2, kicker rollers 16a are arranged at the bottom of the feeding hopper 14. The kicker rollers 16a feed the banknotes placed in the feeding hopper 14, one by one, to the interior of the housing 12. A display unit 62a like an LCD, etc., that displays the processing status of the banknote processing apparatus 10, and operating keys 62b that can be operated for issuing instructions for banknote processing are provided in the operating and display unit 62.

A banknote aligning member 42 is arranged to each of the left and right on a front face of the reject unit 40. Each banknote aligning member 42 can be pulled down manually by the apparatus operator toward the front of the housing 12 from the position shown in FIG. 2 (that is, left forward in FIG. 2). The banknotes that are conveyed to the reject unit 40 are therefore stacked in the reject unit 40 after being aligned by the banknote aligning member 42. The apparatus operator can remove the banknotes from the reject unit 40 after pulling down the banknote aligning member 42 toward the front of the housing 12.

A shutter 34 is arranged on a front face of the stacking unit 30 to close an opening of the stacking unit 30. The shutter 34 can be used to selectively close or open the opening on the front face of the stacking unit 30.

Figure 3:
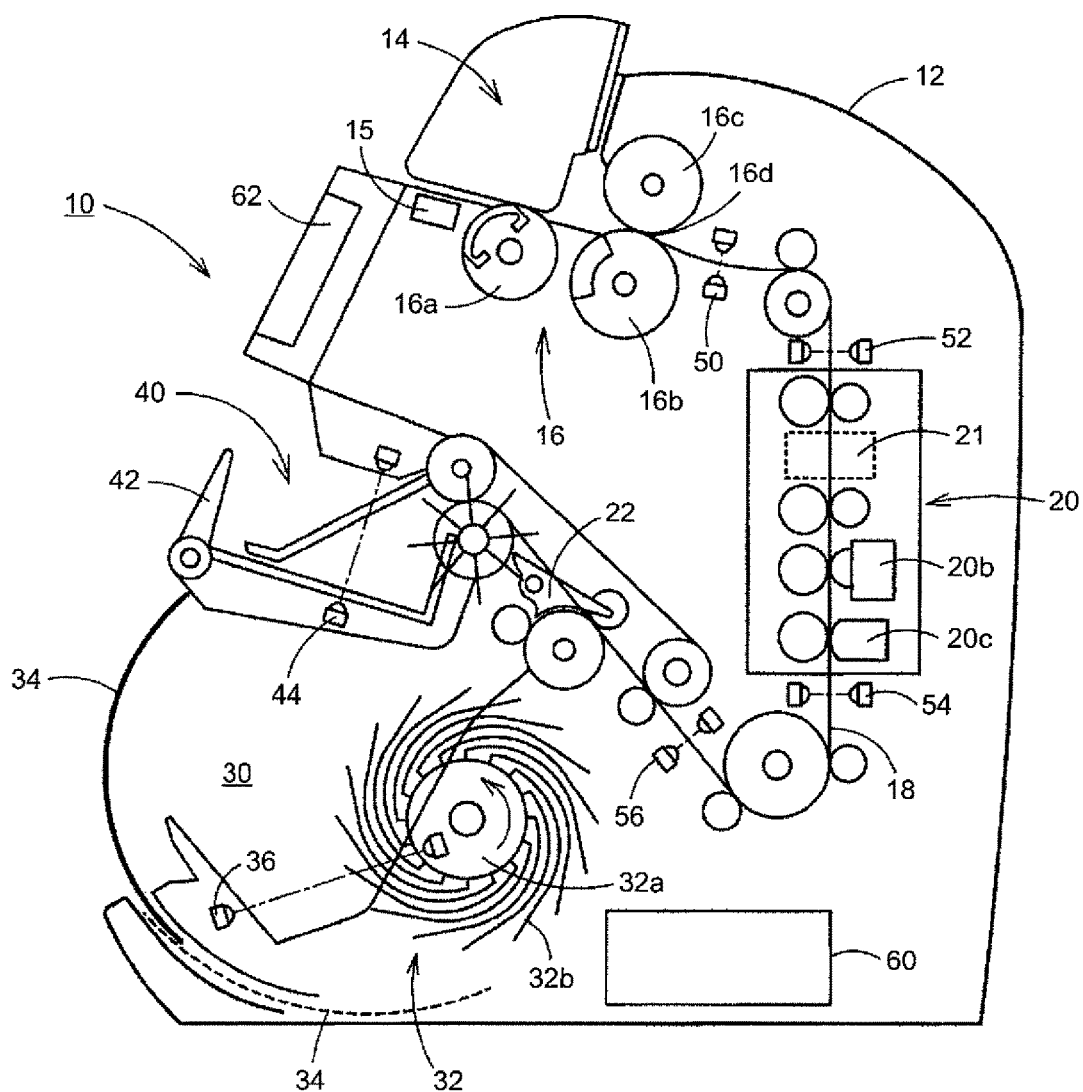
FIG. 3 is a drawing of a schematic inner physical structure of the banknote processing apparatus shown in FIG. 2.

A schematic inner physical structure of the banknote processing apparatus 10 shown in FIG. 2 is explained next. FIG. 3 is a drawing of a schematic inner physical structure of the banknote processing apparatus 10.

The banknote processing apparatus 10 includes a feeding unit 16 to feed the bottommost banknote from among the banknotes placed in the feeding hopper 14, one by one, into the interior of the housing 12, and a transport path 18 that is arranged inside the housing 12 and along which the banknotes fed into the interior of the housing 12 from the feeding unit 16 are transported one by one. An identifying and counting unit 20 that identifies and counts the banknotes fed into the interior of the housing 12 by the feeding unit 16 is arranged on the transport path 18.

The feeding unit 16 includes the kicker rollers 16a that contacts the bottommost banknote from among the banknotes placed in a stack in the feeding hopper 14, and feed rollers 16b that are arranged downstream of the kicker rollers 16a in a feeding direction of the banknote and that feed the banknote kicked out by the kicker roller 16a into the interior of the housing 12. Reversing rollers 16c are arranged opposed to the feed rollers 16b. A gate part 16d is formed between the feed roller 16b and the reversing roller 16c. The banknotes that are kicked out by the kicker rollers 16a pass through the gate parts 16d and are fed one by one to the transport path 18 into the interior the housing 12. A feeding unit driving mechanism 17 (see FIG. 6) that drives the feeding unit 16 is provided inside the housing 12. The feeding unit driving mechanism 17 includes a feed motor that drives the kicker rollers 16a and the feed rollers 16b, a rotational speed sensor that detects rotational speeds of the kicker rollers 16a and the feed rollers 16b, and a speed controller that controls a rotational speed of the feed motor based on the rotational speeds detected by the rotational speed sensor.

As shown in FIG. 3, a banknote presence detection sensor 15 is arranged in the feeding hopper 14. The banknote presence detection sensor 15 detects the presence/absence of the banknote in the feeding hopper 14. Specifically, the banknote presence detection sensor 15 is a reflective optical sensor integrally constituted with a light emitting unit and a photodetecting unit. When a banknote is present in the feeding hopper 14, the light emitted by the light emitting unit is reflected by the banknote and reaches the photodetecting unit, and when no banknote is present in the feeding hopper 14, no light is reflected nor reaches the photodetecting unit. In this manner, the banknote presence detection sensor 15 detects whether a banknote is present in the feeding hopper 14.

The transport path 18 represents a path along which the banknote is transported in a state of being nipped between rollers and not shown banknote guides and between opposing rollers. A transport unit driving mechanism 19 (see FIG. 6) that drives a transport unit that performs banknote transportation along the transport path 18 is arranged inside the housing 12. The transport unit driving mechanism 19 includes a transport motor that causes a driving roller to rotate, and a speed controller that controls a speed of the transport motor. By arranging the feeding unit driving mechanism 17 and the transport unit driving mechanism 19 separately, the feeding unit 16 and the transport unit that performs the banknote transportation along the transport path 18 are driven by different driving systems.

The identifying and counting unit 20 that identifies and counts the banknotes fed by the feeding unit 16 into the interior of the housing 12 is arranged on the transport path 18. As shown in FIG. 3, the identifying and counting unit 20 includes a line sensor 21, a thickness detection sensor 20b, and a magnetic sensor 20c. The line sensor 21 is arranged sandwiching a transport path of the banknote and includes a light source that emits light and a photodetecting sensor that measures a strength of received light. The line sensor 21 is capable of measuring strength of the light that is reflected by the banknote and a strength of the light that is transmitted through the banknote when the banknote is irradiated with lights of plural wavelengths emitted by the light emitting unit. A detailed structure of the line sensor 21 is explained later. The thickness detection sensor 20b detects a thickness of the banknote passing through the thickness detection sensor 20b. The thickness detection sensor 20b detects if there is any fold in the banknote, or if two or more banknotes have been fed at a time, or if a tape, etc., is stuck to any part of the banknote, etc., based on the detected thickness of the banknote. The magnetic sensor 20c detects a magnetic field of magnetic components present in an ink, etc., used for printing the banknote passing through the magnetic sensor 20c. The magnetic sensor 20c calculates a detection value pertaining to the magnetic property of the banknote. The identifying and counting unit 20 identifies the authenticity, fitness, denomination, etc., of the banknote, and whether any transport abnormality has occurred, and also counts the banknotes, based on respective detection results of the line sensor 21, the thickness detection sensor 20b, and the magnetic sensor 20c.

As shown in FIG. 3, the transport path 18 branches into two transport paths at a point downstream from the identifying and counting unit 20. The stacking unit 30 is connected to the downstream end of one transport path of the transport path 18 and the reject unit 40 is connected to the downstream end of the other transport path of the transport path 18. The banknote that has been identified and counted by the identifying and counting unit 20 is selectively conveyed to the stacking unit 30 or the reject unit 40. The front face (the face on the left side in FIG. 3) of the stacking unit 30 has an opening through which the operator can remove the banknotes stacked in the stacking unit 30. The front face of the reject unit 40 also has an opening through which the operator can remove the banknotes stacked in the reject unit 40.

As shown in FIG. 3, a diverting unit 22 that includes a diverting member and a not shown driving unit is arranged at the point where the transport path 18 branches into the two transport paths. The diverting unit 22 selectively conveys the banknote conveyed from upstream of the diverting unit 22 to one of the two transport paths of the transport path 18.

As shown in FIG. 3, an impeller-type stacking mechanism 32 is arranged on the right side of the stacking unit 30. During operation of the banknote processing apparatus 10, a driving unit rotates an impeller 32a of the impeller-type stacking mechanism 32 so that the impeller 32a always rotates in a direction of an arrow shown in FIG. 3. The banknotes are conveyed one by one from the transport path 18 to the impeller 32a. The impeller 32a receives the banknote conveyed from the transport path 18 between two blades 32b and conveys this banknote to the stacking unit 30. In this manner, the banknotes are conveyed from the impeller 32a to the stacking unit 30 one by one, and stacked in the stacking unit 30 in an aligned state.

As shown in FIG. 3, the shutter 34 that closes the opening in the front face of the stacking unit 30 is arranged in the banknote processing apparatus 10. A shutter driving mechanism 35 (see FIG. 6) that drives the shutter 34 is arranged inside the housing 12. The shutter driving mechanism 35 causes the shutter 34 to move between an open position (the position denoted by the dotted line in FIG. 3) at which the shutter 34 retreats beneath the stacking unit 30 leaving the opening of the stacking unit 30 open and a closed position (the position denoted by the solid line in FIG. 3) at which the shutter 34 closes the opening in the front face of the stacking unit 30. That is, when the shutter 34 is at the open position denoted by the dotted line in FIG. 3, the operator can access the banknotes stacked in the stacking unit 30. On the other hand, when the shutter 34 is at the closed position denoted by the solid line in FIG. 3, the opening in the front face of the stacking unit 30 is closed by the shutter 34, and the operator therefore cannot access the banknotes stacked in the stacking unit 30.

A banknote presence detection sensor 36 is arranged in the stacking unit 30. The banknote presence detection sensor 36 detects the presence/absence of the banknote in the stacking unit 30 by using transmitted light.

In the reject unit 40, on the other hand, there is no shutter to close an opening in the front face of the reject unit 40. The operator can remove the banknotes from the reject unit 40 by pulling down the banknote aligning member 42 toward the front of the housing 12. A banknote presence detection sensor 44 is arranged in the reject unit 40. The banknote presence detection sensor 44 detects the presence/absence of the banknote in the reject unit 40. Specifically, the banknote presence detection sensor 44 includes a light emitting unit and a photodetecting unit. When there are no banknotes stacked in the reject unit 40, the light emitted by the light emitting unit is received by the photodetecting unit. On the other hand, when banknotes are present in the reject unit 40, the light emitted by the light emitting unit is blocked by the banknote and does not reach the photodetecting unit. Based on this, the banknote presence detection sensor 44 detects if banknotes are stacked in the reject unit 40.

As shown in FIG. 3, plural passage sensors 50, 52, 54, and 56 are arranged on the transport path 18. Specifically, the first passage sensor 50 is arranged at a position between the feeding unit 16 and the transport path 18. The first passage sensor 50 detects the banknote fed by the feeding unit 16. The first passage sensor 50 detects the state of the banknote on the transport path 18 immediately after the banknote is fed.

The second passage sensor 52 and the third passage sensor 54 are arranged on the transport path 18 at positions upstream and downstream, respectively, of the identifying and counting unit 20. The second passage sensor 52 detects the banknote before the banknote is conveyed to the identifying and counting unit 20 and the third passage sensor 54 detects the banknote after the banknote has been identified and counted by the identifying and counting unit 20. The fourth passage sensor 56 is arranged on the transport path 18 at a position upstream of the diverting unit 22. The fourth passage sensor 56 detects the banknote before the banknote is diverted by the diverting unit 22.

Each of the passage sensors 50, 52, 54, and 56 includes a light emitting unit and a photodetecting unit that are arranged sandwiching the banknote being transported along the transport path 18. When no banknote is present between the light emitting unit and photodetecting unit of each of the passage sensors 50, 52, 54, and 56, the light emitted by the light emitting unit is received by the photodetecting unit. On the other hand, when the banknote passes by the passage sensors 50, 52, 54, and 56, the light emitted by the light emitting unit is blocked by the banknote and does not reach the photodetecting unit. Based on this, each of the passage sensors 50, 52, 54, and 56 detects the presence of the banknote.

A control unit 60 that controls all the constituent elements of the banknote processing apparatus 10 is arranged inside the housing 12. A configuration of the control unit 60 is explained in detail with reference to FIG. 6. The operation and display unit 62 is an input and output unit that displays the processing status of the banknote processing apparatus 10 and receives instruction operation for processes relating to the banknote.

Figure 4A:
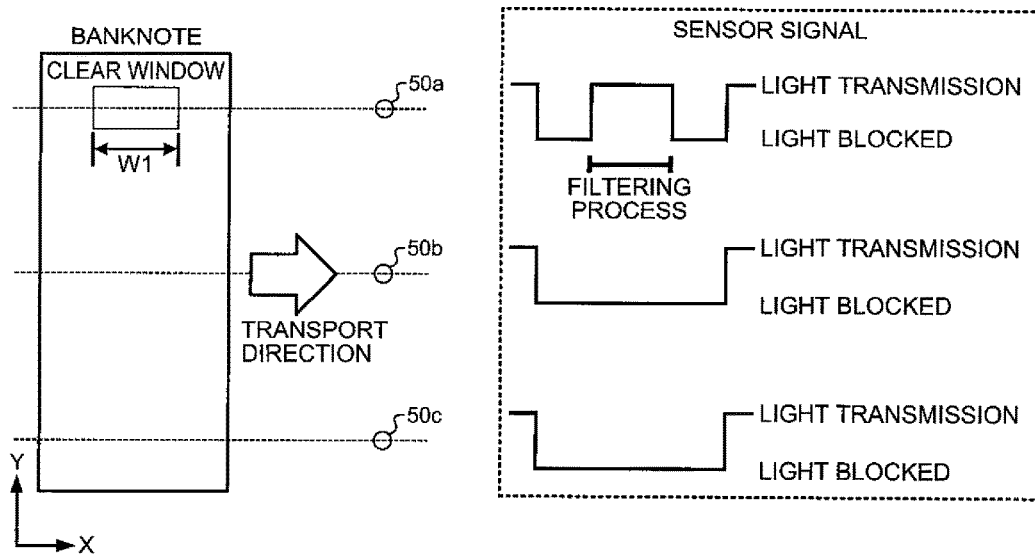
FIGS. 4A and 4B are drawings for explaining a transport process of a banknote having a clear window performed by the banknote processing apparatus shown in FIG. 2.
Figure 4B:
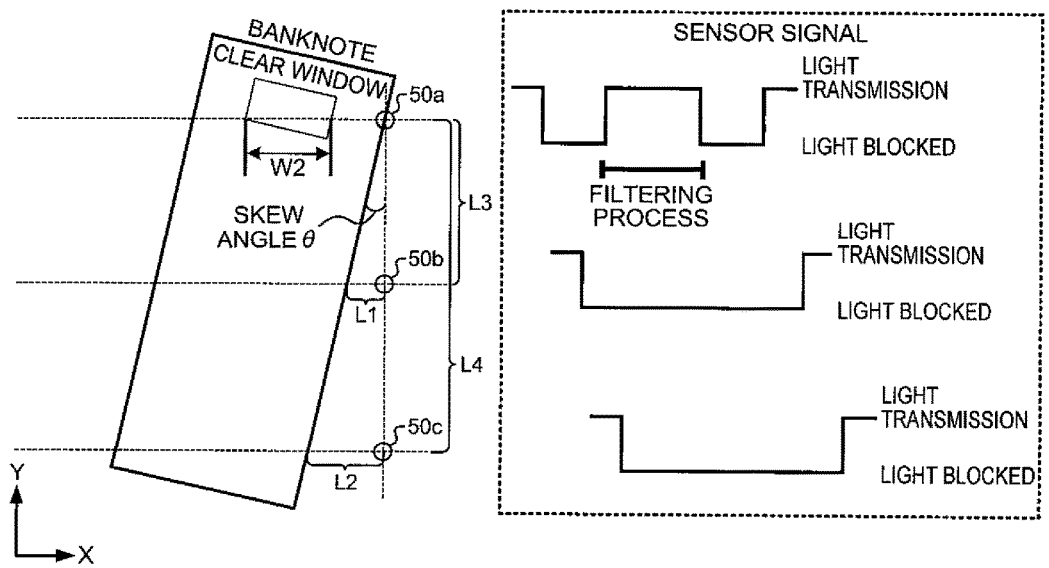

A transport process of a banknote having a clear window performed by the banknote processing apparatus 10 shown in FIG. 2 is explained with reference to FIGS. 4A and 4B. FIG. 4A is a drawing for explaining a case where a transporting direction with long side first of the banknote which has a clear window matches with the X-axis direction that represents a transport direction and where the banknote is not skewed. In contrast, FIG. 4B is a drawing for explaining a case where the banknote having a clear window is skewed such that the banknote in the same transport direction is slanted at an angle, indicated by θ, relative to the X-axis direction that represents the transport direction.

In the case of a banknote without a clear window that allows light to pass through, in the banknote processing apparatus 10, the passage sensors 50, 52, 54, and 56 detect the presence of the banknote when the light is blocked, and if after being blocked for a while, the light passes through again, the passage sensors 50, 52, 54, and 56 detect that the banknote has passed by. However, as shown in FIGS. 4A and 4B, in the case of a banknote having a clear window that allows light to pass through, even if the passage sensors 50, 52, 54, and 56 detect that after being blocked once, the light passes through, when the clear window arrives at the positions of the passage sensors, it cannot be determined that the banknote has passed by the passage sensors 50, 52, 54, and 56.

The banknote in FIG. 4A is an example of a banknote having a clear window. When transported without a skew along the positive direction of X-axis as shown in FIG. 4A, this banknote passes at passage sensors 50a, 50b, and 50c. The clear window that is located on the upper part of the banknote passes at the passage sensor 50a. Hence, as shown in FIG. 4A, a sensor signal shows a light blocked state for a while, followed by a light transmission state when the clear window passes at the passage sensor 50a, and once again a light blocked state after the clear window has passed at the passage sensor 50a. When the entire banknote has passed at the passage sensor 50a, the sensor signal shows a light transmission state. Because no clear window is present in a scanning line of the banknote at the other passage sensors 50b and 50c, the sensor signals thereof show a light blocked state, and after the entire banknote has passed by, show a light transmission state.

When handling banknote that has a clear window at a predetermined position as explained above, to avoid mistakenly determining the passage of the clear window as the end of the passage of the banknote, a filtering process is performed whereby the detection of transmission of light within a period that corresponds to a width (W1) of the clear window in the transport direction is not mistakenly determined to be the end of the passage of the banknote. However, in the case shown in FIG. 4A, because the clear window only affects the detection performed by the passage sensor 50a, no filtering process is performed for the detection of the light transmission state by the passage sensors 50b and 50c. The banknote processing apparatus 10 performs the filtering process based on information pertaining to a time interval for which light transmission is to be ignored during the filtering process that the banknote processing apparatus 10 holds therein for each of the passage sensors 50, 52, 54, and 56 in accordance with the position and size of the clear window of the banknote to be processed by the banknote processing apparatus 10.

While FIG. 4A depicts the case where the banknote being transported is not skewed, FIG. 4B depicts the case where the banknote being transported is skewed. As shown in FIG. 4B, depending on the position and shape of the clear window, a length of the scanning line of the passage sensors 50, 52, 54, and 56 for the clear window is different from the case shown in FIG. 4A because the banknote being transported is skewed. In the cases shown in FIGS. 4A and 4B, a length of the scanning line (W2) of the passage sensor 50a for the clear window shown in FIG. 4B is longer than a length of the scanning line (W1) of the passage sensor 50a for the clear window shown in FIG. 4A. Hence, in the case shown in FIG. 4S, if the time interval corresponding to W1 is used in the filtering process, the clear window will be mistakenly detected as an interval between banknotes.

The banknote processing apparatus 10 calculates a skew angle θ from lengths L1 or L2, which are calculated from a transport speed of the banknote and a time difference between light blocking periods detected by the passage sensors 50a, 50b, and 50c, and an inter-sensor distance L3 or L4 shown in FIG. 4. The banknote processing apparatus 10 calculates the length of the scanning line (W2) of the passage sensor 50a for the clear window shown in FIG. 4B from the calculated skew angle θ and the width (W1) of the clear window. After detection of the skew shown in FIG. 4B, a filtering process is performed using a time period corresponding to W2 calculated as explained above. Hence, even if the banknote is skewed, mistakenly detecting the clear window as the passage of the banknote can be avoided. However, there can be variations due to a shift in the Y-axis direction on the transport path, even if the banknote is transported at the same skew angle θ. Hence, W2 is calculated by taking into consideration the maximum value of the range of variations in the Y-axis direction on the transport path. In the present explanation, the positions of the passage sensors 50a, 50b, and 50c are shown as examples; and the control unit is required to possess information pertaining to the position and size of the clear window of the banknote that is being transported in advance. Therefore, it is necessary that the denomination and orientation of the banknote that is being transported is specified in advance. Alternatively, this processing can be performed related to a passage sensor located downstream of a banknote identification unit of image identification type.

Figure 5:
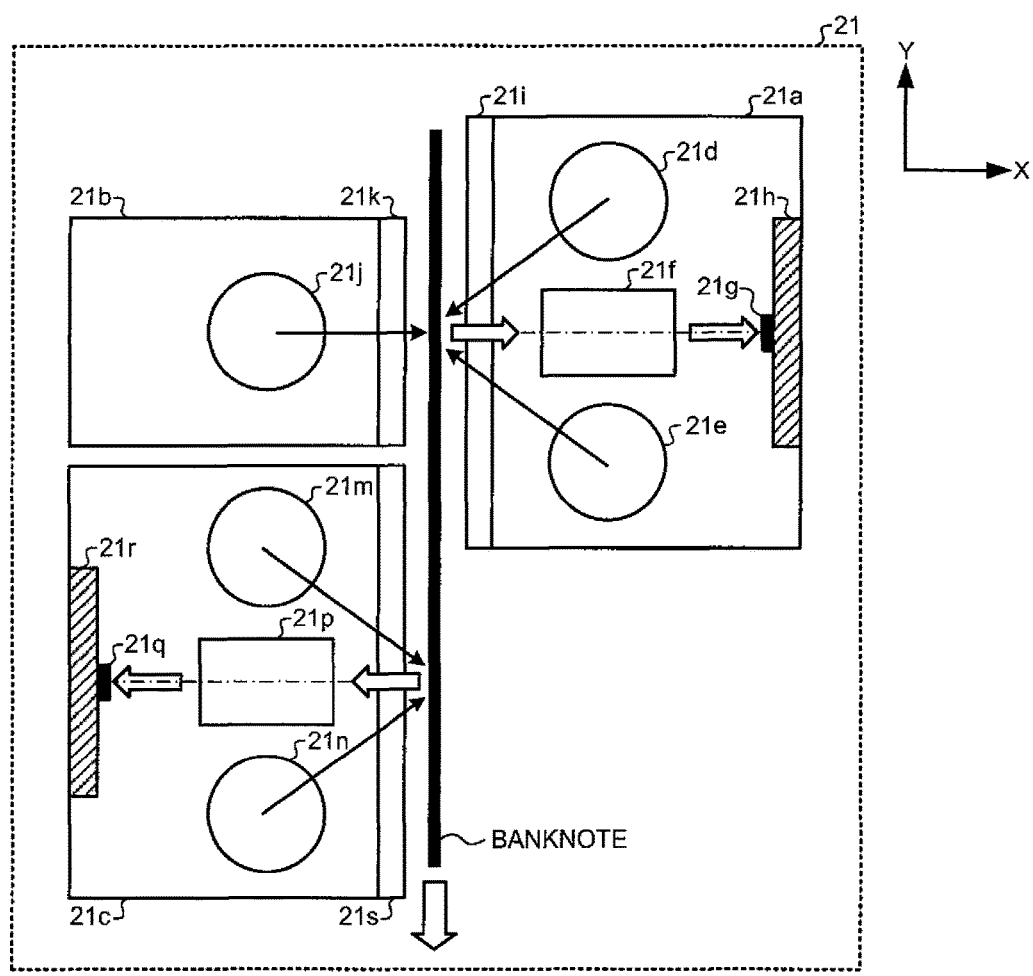
FIG. 5 is a drawing of a detailed structure of a line sensor of the banknote processing apparatus shown in FIG. 3.

A structure of the line sensor 21 of the banknote processing apparatus 10 shown in FIG. 3 is explained in detail below. FIG. 5 is a drawing of a detailed structure of the line sensor 21 of the banknote processing apparatus 10.

The banknote processing apparatus 10 according to the present embodiment includes the transport path along which the banknote is transported. The transport direction of the banknote is taken as a Y-axis negative direction, the axis perpendicular to the surface of the banknote is taken as an X-axis, and the axis that is orthogonal to the X-axis and the Y-axis is taken as a Z-axis. It is supposed that the banknote is transported substantially vertically, the X-axis positive side is the upside and the X-axis negative side is the downside. For convenience of explanation, the surface of the banknote on the X-axis positive side is referred to as the first side and the surface of the banknote on the X-axis negative side is referred to as the opposite side.

The line sensor 21 of the banknote processing apparatus 10 includes a first light emitting and photodetecting unit 21a, a light emitting unit 21b, and a second light emitting and photodetecting unit 21c. A cross-sectional schematic diagram of each of the first light emitting and photodetecting unit 21a, the light emitting unit 21b, and the second light emitting and photodetecting unit 21c as seen from the Z-axis direction is shown in FIG. 5. As shown in FIG. 5, the first light emitting and photodetecting unit 21a and the light emitting unit 21b are arranged sandwiching the transport path. The second light emitting and photodetecting unit 21c is arranged on the opposite to the first light emitting and photodetecting unit 21a, with the transport path sandwiched therebetween, at a position contiguous with the first light emitting and photodetecting unit 21a and the light emitting unit 21b in the transport direction of the banknote.

A transparent member 21i made of glass or resin is fitted on a bottom surface (the surface facing the banknote) of a housing of the first light emitting and photodetecting unit 21a. The first light emitting and photodetecting unit 21a includes a first light source 21d that irradiates the first side of the banknote with light. The first light emitting and photodetecting unit 21a further includes a first light collecting lens 21f and a first circuit board 21h. Plural first photodetecting sensors 21g are arrayed on the first circuit board 21h in the Z-axis direction to form an image line sensor.

The first light collecting lens 21f is arranged so as to collect the reflected light from the first side of the banknote that is irradiated by the first light source 21d and to cause the first photodetecting sensor 21g to detect the collected reflected light. Consequently, an output of the first photodetecting sensor 21g can be used to generate a first side reflected image data of the banknote.

The first light emitting and photodetecting unit 21a further includes a second light source 21e that irradiates the first side of the banknote with reflected light. The light irradiated from the second light source 21e is reflected by the first side of the banknote, collected by the first light collecting lens 21f, and detected by the first photodetecting sensor 21g. The second light source 21e is used to supplement a light amount of the first light source 21d during the generation of the first side reflected image data of the banknote.

The light emitting unit 21b is arranged opposite to the first light emitting and photodetecting unit 21a, with the transport path sandwiched therebetween. A transparent member 21k made of glass or resin is fitted on a top surface (the surface facing the banknote) of a housing of the light emitting unit 21b. The light emitting unit 21b includes a third light source 21j that irradiates the opposite side of the banknote with light. When the opposite side of the banknote is irradiated with the light from the third light source 21j, the transmitted light that passes through the banknote is collected by the first light collecting lens 21f, and is detected by the first photodetecting sensor 21g. In this manner, an output of the first photodetecting sensor 21g in response to the light emitted by the third light source 21j can be used to generate a transmission image data obtained by the irradiation of the opposite side of the banknote with light.

The second light emitting and photodetecting unit 21c is arranged on the opposite side from the first light emitting and photodetecting unit 21a relative to the transport path. A transparent member 21s made of glass or resin is fitted on an upper surface (the surface facing the banknote) of a housing of the second light emitting and photodetecting unit 21c. The second light emitting and photodetecting unit 21c includes a fourth light source 21m and a fifth light source 21n that irradiate the opposite side of the banknote with light. The second light emitting and photodetecting unit 21c further includes a second light collecting lens 21p and a second circuit board 21r. Plural second photodetecting sensors 21q are arranged on the second circuit board 21r in the Z-axis direction to form an image line sensor.

The second light collecting lens 21p is arranged so as to collect the reflected light from the opposite side of the banknote that is irradiated by the fourth light source 21m and the fifth light source 21n and to cause the second photodetecting sensor 21q to detect the collected reflected light. Consequently, an output of the second photodetecting sensor 21q can be used to generate an opposite side reflected image data of the banknote.

Each of the first light source 21d, the second light source 21e, the third light source 21j, the fourth light source 21m, and the fifth light source 21n is capable of switching between emitting the red light, the green light, the violet light, and the infrared light. SELFOC (registered trademark) lens can be used as the first light collecting lens 21f and the second light collecting lens 21p.

Figure 6:
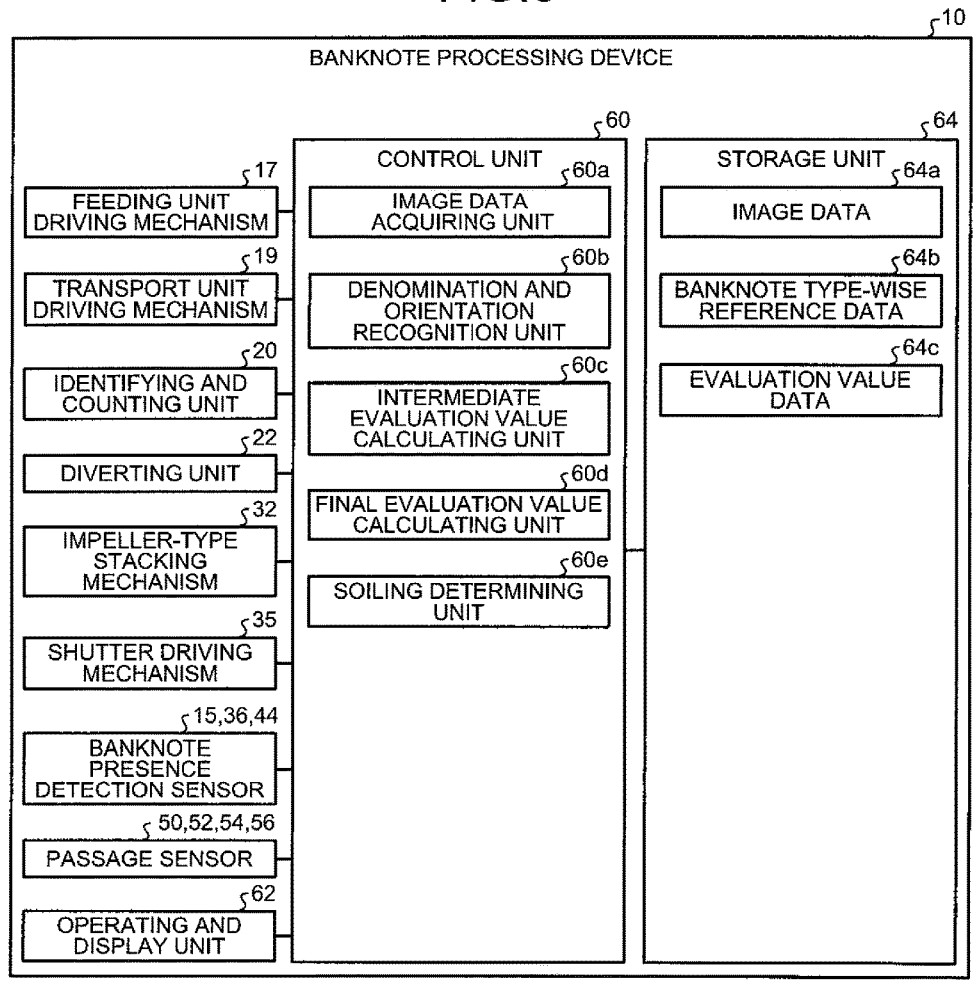
FIG. 6 is a block diagram of an internal configuration according to the embodiment of the banknote processing apparatus shown in FIG. 2.

An interior configuration according to the present embodiment of the banknote processing apparatus 10 shown in FIG. 2 is explained below. FIG. 6 is a block diagram of the interior configuration according to the present embodiment of the banknote processing apparatus 10.

As shown in FIG. 6, the banknote processing apparatus 10 includes the feeding unit driving mechanism 17 that drives the feeding unit 16, the transport unit driving mechanism 19 that drives the transport unit that is concerned with the banknote transportation along the transport path 18, the identifying and counting unit 20, the diverting unit 22, the impeller-type stacking mechanism 32, the shutter driving mechanism 35 that drives the shutter 34, the banknote presence detection sensors 15, 36, and 44, the passage sensors 50, 52, 54, and 56, the operation and display unit 62, a storage unit 64, and the control unit 60.

The feeding unit driving mechanism 17 that drives the feeding unit 16, the transport unit driving mechanism 19 that drives the transport unit that is concerned with the banknote transportation along the transport path 18, the identifying and counting unit 20, the diverting unit 22, the impeller-type stacking mechanism 32, the shutter driving mechanism 35 that drives the shutter 34, the banknote presence detection sensors 15, 36, and 44, the passage sensors 50, 52, 54, and 56, the operation and display unit 62, and the storage unit 64 are connected to the control unit 60.

The identifying and counting unit 20 includes the line sensor 21, the thickness detection sensor 20b, and the magnetic sensor 20c. Following instructions issued by the control unit 60, the identifying and counting unit 20 obtains various types of image data, a thickness detection result, magnetic data, etc., of the banknote from these sensors, and notifies the control unit 60 of the obtained data.

The control unit 60 controls the feeding unit driving mechanism 17, the transport unit driving mechanism 19, the diverting unit 22, the impeller-type stacking mechanism 32, the shutter driving mechanism 35, and the operation and display unit 62 by issuing instructions to these constituent elements. The control unit 60 conveys instructions pertaining to target values of the rotational speeds of the kicker roller 16a and the feed roller 16b to the feeding unit driving mechanism 17, and the feeding unit driving mechanism 17 controls the feed motor such that the actual rotational speeds of the kicker roller 16a and the feed roller 16b match with these target values. The control unit 60 conveys instructions pertaining to a target value of a speed of the banknote being transported along the transport path 18 to the transport unit driving mechanism 19, and the transport unit driving mechanism 19 controls the transport motor based on this target value of the speed.

The banknote presence detection sensors 15, 36, and 44 detect the presence/absence of the banknote and notify the control unit 60 of their findings. The passage sensors 50, 52, 54, and 56 detect passing conditions of the banknote and notify the control unit 60 of their findings.

The storage unit 64 is a storage device constituted by a hard disk device, a non-volatile memory, and the like. The storage unit 64 stores therein image data 64*a*, banknote type-wise reference data 64*b*, and evaluation value data 64*c*.

The image data 64*a* for one banknote is constituted by a total of 12 types of image data, of which four are first side reflected image data corresponding to the lights of four wavelength types, four are transmission image data corresponding to the lights of four wavelength types, and four are opposite side reflected image data corresponding to the lights of four wavelength types.

The banknote type-wise reference data 64*b* contains information pertaining to the determination of degree of soiling for each of the banknote types and the orientations in which the banknote is set. The information pertaining to the determination of degree of soiling includes information necessary for calculating the evaluation value of the degree of soiling and a threshold value for determining the degree of soiling. A detailed explanation is given later.

The evaluation value data 64*c* is information that is output during the process of determination of degree of soiling of the banknote, and is data that includes determination results of the banknote type and the banknote orientation, the evaluation value that indicates the degree of soiling of the banknote that is calculated by using the image data 64*a* and the banknote type-wise reference data 64. A determination result obtained by comparison of the evaluation value and the threshold values of banknote type-wise reference data 64*b*.

The control unit 60 controls the entire banknote processing apparatus 10, and includes an image data acquiring unit 60*a*, a denomination and orientation recognition unit 60*b*, an intermediate evaluation value calculating unit 60*c*, a final evaluation value calculating unit 60*d*, and a soiling determining unit 60*e*. In actuality, computer programs corresponding to the above functional units are stored in a not shown ROM or a non-volatile memory, and these computer programs are loaded onto the CPU (Central Processing Unit) and executed to realize corresponding processes.

The image data acquiring unit 60*a* acquires the 12 types of images of the banknote being transported along the transport path 18 by controlling the line sensor 21, and stores the images in the image data 64*a*. Out of the 12 types of images, the four types of—a first side reflected image data is generated by storing line data acquired by the first light emitting and photodetecting unit 21*a*. The four types of transmission image data are generated by storing line data acquired by the light emitting unit 21*b* and the first light emitting and photodetecting unit 21*a*. The four types of the opposite side (of the first side) reflected image data are generated by storing line data acquired by the second light emitting and photodetecting unit 21*c*. How these 12 image types are acquired will be explained below in detail.

The image data acquiring unit 60*a* sequentially irradiates the first side of the banknote with the lights of the four wavelength types by using the first light source 21*d* and the second light source 21*e* at each position of the banknote in the transport direction, receives an output from the first photodetecting sensor 21*g*, and stores in the image data 64*a* four types of first side reflection line data corresponding to the lights of the four wavelength types. The image data acquiring unit 60*a* then stores in the image data 64*a* the first side reflection line data for all the positions of the banknote in the transport direction to generate, from among the image data 64*a*, the four types of first side reflected image data corresponding to the lights of the four wavelength types.

The image data acquiring unit 60*a* sequentially irradiates the opposite side of the banknote with the lights of the four wavelength types by using the third light source 21*j* at each position of the banknote in the transport direction, receives an output from the first photodetecting sensor 21*g*, and stores in the image data 64*a* four types of transmission line data corresponding to the lights of the four wavelength types. The image data acquiring unit 60*a* then stores in the image data 64*a* the transmission line data for all the positions of the banknote in the transport direction and generates, from among the image data 64*a*, the four types of transmission image data corresponding to the lights of the four wavelength types.

The image data acquiring unit 60*a* sequentially irradiates the opposite side of the banknote with the lights of the four wavelength types by using the fourth light source 21*m* and the fifth light source 21*n* at each position of the banknote in the transport direction, receives an output from the second photodetecting sensor 21*q*, and stores in the image data 64*a* four types of opposite side reflection line data corresponding to the lights of the four wavelength types. The image data acquiring unit 60*a* then stores in the image data 64*a* the opposite side reflection line data for all the positions of the banknote in the transport direction and generates, from among the image data 64*a*, the four types of opposite side reflected image data corresponding to the lights of the four wavelength types.

The denomination and orientation recognition unit 60*b* is a processing unit that recognizes the banknote type and the banknote orientation from the image data 64*a*.

The intermediate evaluation value calculating unit 60*c* is a processing unit that calculates the intermediate evaluation values that are required for calculating the final evaluation value that indicates the degree of soiling of the banknote, based on the image data 64*a* and the banknote type-wise reference data 64*b*. The intermediate evaluation value calculating unit 60*c* calculates, based on the banknote type-wise reference data 64*b*, one intermediate evaluation value or plural intermediate evaluation values by using one image or plural images from among the 12 image types included in the image data 64*a*.

The final evaluation value calculating unit 60*d* is a processing unit that calculates the final evaluation value that indicates the degree of soiling of the banknote based on the one or plural intermediate evaluation values calculated by the intermediate evaluation value calculating unit 60*c* and the banknote type-wise reference data 64*b*.

The soiling determining unit 60*e* is a processing unit that determines whether the banknote is an unfit banknote by comparing the final evaluation value calculated by the final evaluation value calculating unit 60*d* and the determination threshold value included in the banknote type-wise reference data 64*b*.

A data structure according to the present embodiment of the banknote processing apparatus 10 shown in FIG. 2 is explained below. FIGS. 7 and 8 are drawings for explaining the data structure according to the present embodiment of the banknote processing apparatus 10.

As shown in FIG. 7, the image data 64a includes an image number, an image acquiring sensor category, a light source type, and acquired image data corresponding to the image number, the image acquiring sensor category and the light source type. The image acquiring sensor category is information that indicates whether the image is acquired by the first photodetecting sensor 21g or the second photodetecting sensor 21q. The image acquiring sensor category "the first side" indicates that the image has been acquired by the first photodetecting sensor 21g and "the opposite side" indicates that the image has been acquired by the second photodetecting sensor 21q. The light source type is the type of the light source that lights up during image acquisition. The light source type includes a "reflective red light" that indicates a red light source that irradiates the first side, a "reflective green light" that indicates a green light source that irradiates the first side, a "reflective violet light" that indicates a violet light source that irradiates the first side, a "reflective infrared light" that indicates an infrared light source that irradiates the first side, a "transmissive red light" that indicates a red light source that irradiates the opposite side, a "transmissive green light" that indicates a green light source that irradiates the opposite side, a "transmissive violet light" that indicates a violet light source that irradiates the opposite side, a "transmissive infrared light" that indicates an infrared light source that irradiates the opposite side, a "reflective red light" that indicates a red light source that irradiates the opposite side, a "reflective green light" that indicates a green light source that irradiates the opposite side, a "reflective violet light" that indicates a violet light source that irradiates the opposite side, a "reflective infrared light" that indicates an infrared light source that irradiates the opposite side.

As shown in FIG. 7, the acquired image data corresponding to an image number "1" is image data corresponding to the image acquiring sensor category "the first side" and the light source type "reflective red light". The acquired image data corresponding to an image number "2" is image data corresponding to the image acquiring sensor category "the first side" and the light source type "reflective green light". The acquired image data corresponding to an image number "3" is image data corresponding to the image acquiring sensor category "the first side" and the light source type "reflective violet light". The acquired image data corresponding to an image number "4" is image data corresponding to the image acquiring sensor category "the first side" and the light source type "reflective infrared light". The acquired image data corresponding to an image number "5" is image data corresponding to the image acquiring sensor category "the first side" and the light source type "transmissive red light". The acquired image data corresponding to an image number "6" is image data corresponding to the image acquiring sensor category "the first side" and the light source type "transmissive green light". The acquired image data corresponding to an image number "7" is image data corresponding to the image acquiring sensor category "the first side" and the light source type "transmissive violet light". The acquired image data corresponding to an image number "8" is image data corresponding to the image acquiring sensor category "the first side" and the light source type "transmissive infrared light". The acquired image data corresponding to an image number "9" is image data corresponding to the image acquiring sensor category "the opposite side" and the light source type "reflective red light". The acquired image data corresponding to an image number "10" is image data corresponding to the image acquiring sensor category "the opposite side" and the light source type "reflective green light". The acquired image data corresponding to an image number "11" is image data corresponding to the image acquiring sensor category "the opposite side" and the light source type "reflective violet light". The acquired image data corresponding to an image number "12" is image data corresponding to the image acquiring sensor category "the opposite side" and the light source type "reflective infrared light".

As shown in FIG. 7, the evaluation value data 64c includes a banknote determination result, a soiling determination result, the final evaluation value, the number of intermediate evaluation values, and the intermediate evaluation values corresponding to the number of intermediate evaluation values. The banknote identification result includes information pertaining to the banknote issuing country, the banknote denomination, and the orientation of the banknote being transported recognized by the denomination and orientation recognition unit 60b based on the image data 64a. The soiling determination result is the determination result obtained from comparison of the final evaluation value and the threshold value included in the banknote type-wise reference data 64b, and is information pertaining to whether the banknote is "unfit" or a "not unfit".

In the example of the evaluation value data 64c shown in FIG. 7, the banknote inputted into the banknote processing apparatus 10 is a "10,000 Yen note" issued by "Japan", the orientation in which the banknote is set is "A". The soiling determination result of the banknote is "not unfit", the final evaluation value is "Y", the number of intermediate evaluation values is "6", and the intermediate evaluation values are "31.5", "28.7", "25.5", "14.7", "11.2", and "14.0".

As shown in FIG. 8, the banknote type-wise reference data 64b includes intermediate evaluation value calculation parameters, final evaluation value calculation parameters, and determination threshold value for each of the banknote issuing country, the banknote denomination, and the orientation in which the banknote is inputted. There are as many intermediate evaluation value calculation parameters as there are intermediate evaluation values for each of the banknote issuing country of the banknote, the banknote denomination, and the banknote orientation. The intermediate evaluation value calculation parameters include information required for calculating the respective intermediate evaluation values. The intermediate evaluation value calculation parameters include, for each intermediate evaluation value, a used image number, the determination areas, a calculation method, IR ratio to be used or not, and the coefficient. The intermediate evaluation value is calculated by adding pixel values of plural determination areas and multiplying the obtained sum by the coefficient.

The used image number is an image number of the image data 64a that is used in the intermediate evaluation value calculation. One or two image numbers can be specified as the used image number. The determination area is information that indicates an area of the image specified by the image number to be used. When two image numbers are specified as the used image numbers, a determination area common to the two images is specified as the determination area. The parameter calculation method is set when two image numbers are specified as the used image number; the calculation method is specified for the value for each determination area from the pixel values of the two images specified by the image numbers. The determination area is set for each denomination and orientation. As a suitable example, a part that is devoid of any picture pattern, such as a blank portion, a watermark portion, etc., is set as the determination area.

The parameter IR ratio to be used or not specifies whether the pixel value for each determination area should be considered to be the pixel value of the image specified by the used image number or a ratio of the pixel value of the determination area of the image specified by the used image number to the pixel value of the same determination area of the infrared light irradiation image. If the IR ratio to be used or not is "not use", the value of each determination area is considered to be the pixel value of the image specified by the used image number. If the IR ratio to be used or not is "use", the value of each determination area is considered to be the ratio of the pixel value of the determination area of the image specified by the used image number to the pixel value of the same determination area of the infrared light irradiation image. The soiling has less impact on the infrared light irradiation image than on the images obtained from irradiation with other visible lights. Consequently, when calculating the intermediate evaluation value, the ratio of the pixel value of the determination area of the image specified by the image number to the pixel value of the same determination area of the infrared light irradiation image is used instead of using the pixel value of the same determination area of the image specified by the image number as it is. By doing so, even if variation occurs in the pixel value because of the positional relationship between the banknote, the light source, and the sensor, its impact can be reduced. However, an option for specifying whether the IR ratio is to be used or not is provided in the configuration of the banknote type-wise reference data 64b. This is because there is a difference in the quality of the banknotes depending on the banknote issuing country, and there are cases in which when the IR ratio is used for a banknote in which there is a great variation in infrared light irradiation images, the quality of determination cannot be assured.

The final evaluation value calculation parameters include the average value of the intermediate evaluation values calculated in accordance with the specification of the intermediate evaluation value calculation parameters and the variance-covariance matrix of the intermediate evaluation values. The final evaluation value is the Mahalanobis distance of the intermediate evaluation value that can be calculated based on the intermediate evaluation values calculated in accordance with the specification of the intermediate evaluation value calculation parameters, the average value of the intermediate evaluation values included in the final evaluation value calculation parameters, and the variance-covariance matrix of the intermediate evaluation values.

The threshold value for determining whether a banknote is unfit by using the final evaluation value calculated based on the intermediate evaluation value and the final evaluation value calculation parameters is the determination threshold value. If the final evaluation value is greater than or equal to the determination threshold value, it is determined that the banknote is unfit, and if the final evaluation value is less than the determination threshold value it is determined that the banknote is not unfit.

The banknote type-wise reference data 64b in FIG. 8 is data corresponding to a "10,000 yen note", a "5,000 yen note", and a "1,000 yen note" issued by "Japan". Six intermediate evaluation values are specified as to "A" orientation of the "10,000 yen note". The average values of the six intermediate evaluation values are "$\mu 1$", "$\mu 2$", "$\mu 3$", "$\mu 4$", "$\mu 5$", and "$\mu 6$", the variance-covariance matrix of the intermediate evaluation values is "S", and the determination threshold value is "X". It is shown that the first intermediate evaluation value uses the images with the image numbers "1" and "9", and the determination areas are "(2,3), (2,4), (2,5) . . . ". As explained above, because plural used image numbers "1" and "9" is specified, calculation method "g1+g2" is specified, and "use" is specified for IR ratio to be used or not, the value for each determination area is a value obtained by adding a ratio of the pixel value of the image number "1" to the pixel value of the same determination area of the infrared light irradiation image (=image of the image number 4) and a ratio of the pixel value of the image number "9" to the pixel value of the same determination area of the infrared light irradiation image (=image of the image number 12). The first intermediate evaluation value can be calculated by adding the values obtained as calculated above for all the determination areas and multiplying the sum by the "a" specified as the coefficient.

Figure 9:
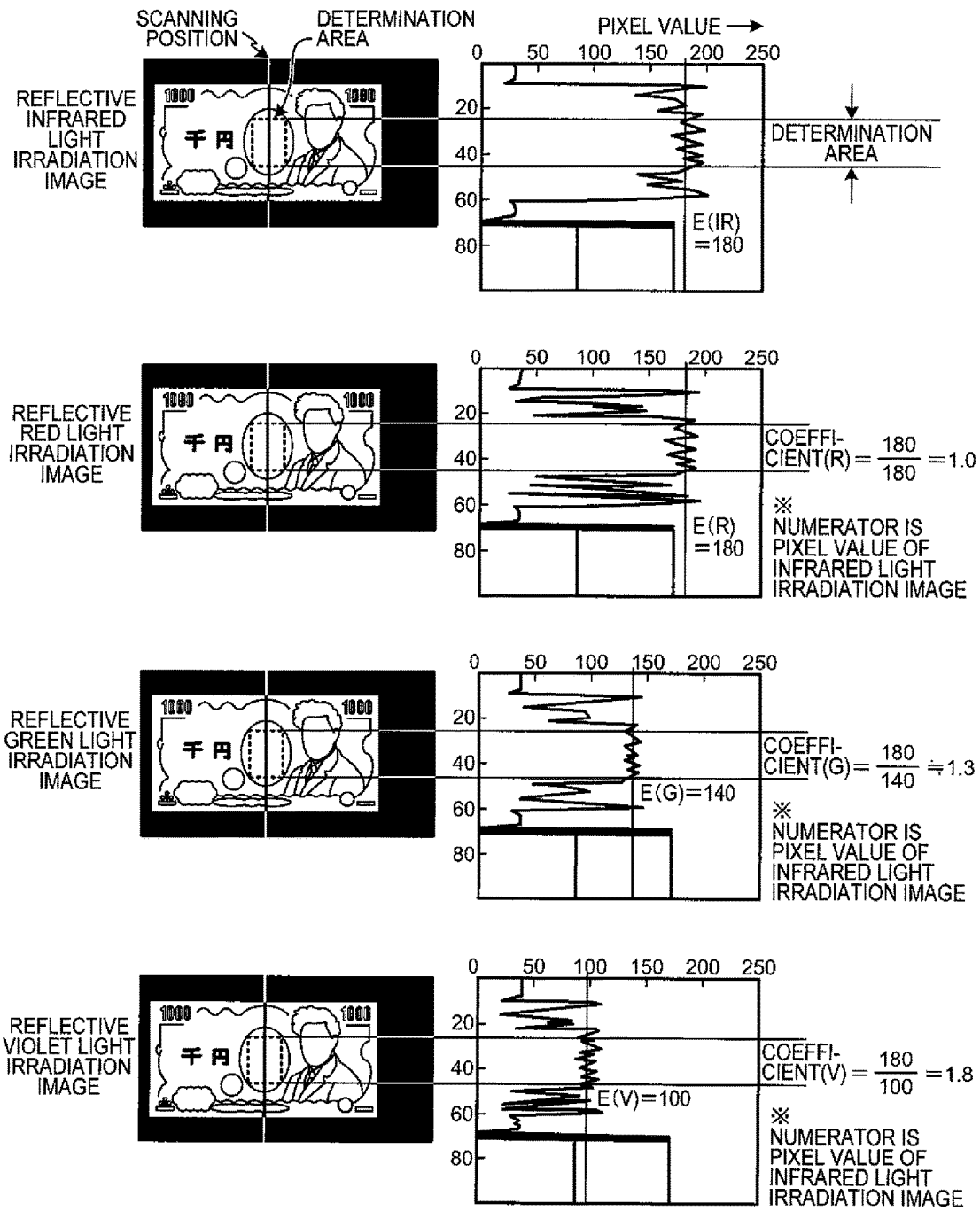
FIG. 9 is a drawing for explaining a determination method of a coefficient included in banknote type-wise reference data shown in FIG. 8.

A determination method of the coefficient of the banknote type-wise reference data 64b shown in FIG. 8 is explained below with reference to FIG. 9. The images shown in FIG. 9 are examples of the infrared light irradiation image, the red light irradiation image, the green light irradiation image, and the violet light irradiation image of the same banknote. The graph to the right of each image shows the relationship between a scanning position of the image and the pixel value. The scanning position is set so as to pass the determination areas that are areas of the image of the banknote with a low contrast and a high pixel values. A line that indicates the average value of the pixel values of the area corresponding to the determination area is shown in each graph which shows an average pixel value E(IR) of the infrared light irradiation image as 180, an average pixel value E(R) of the red light irradiation image as 180, an average pixel value E(G) of the green light irradiation image as 140, and an average pixel value E(V) of the violet light irradiation image as 100.

This indicates that the pixel values of the same banknote differ with the type of light with which the banknote is irradiated. That is, when comparing the pixel values of the images of the determination areas of the images obtained by irradiation with the lights of different types, it is necessary to correct the pixel value level to the same level as one of images, and the value that is used for this correction is the coefficient. As shown in FIG. 9, when the pixel value level is corrected to the same level as that of the infrared light irradiation image, the coefficient corresponding to the determination area of the banknote shown in FIG. 9 is E(IR)÷E(R), which is 1.0, for the red light irradiation image, E(IR)÷E(G), which is 1.3, for the green light irradiation image, and E(IR)÷E(V), which is approximately 1.8, for the violet light irradiation image. In this manner, the coefficients for each banknote type, orientation, and determination area are calculated based on images acquired beforehand, and set in the banknote type-wise reference data 64b. When the degree of soiling determination is performed after correcting the acquired image by the coefficient calculated as explained above, there is an advantage that consistency with the result of determining degree of soiling by visual perception can be enhanced.

A method of defining the determination areas of the banknote type-wise reference data 64b shown in FIG. 8 is explained below with reference to FIG. 10. The determination area of the intermediate evaluation value calculation parameters of the banknote type-wise reference data 64b shown in FIG. 8 is defined by dividing the entire banknote into a grid pattern formed by areas of a predetermined width in the X-axis direction and a predetermined width in the Y-axis direction, and specifying areas in the mesh-like pattern.

In the example shown in FIG. 10, the banknote is divided into m areas in the Y-axis direction and n areas in the X-axis direction, the extreme top left area is denoted as a reference area and represented by (1,1), and the area that is at a position that is a areas away in the negative Y-axis direction from the reference area and b areas away in the positive X-axis direction from the reference area is represented as (1+a,1+b). In this manner, the determination areas shown in FIG. 10 are defined as (2,3), (2,4), (2,5), (2,6), (2,7), (3,3), (3,4), (3,5), (3,6), (3,7), (4,3), (4,4), (4,5), (4,6), and (4,7). The first side serves as a standard for the definition of the area in the image of the opposite side. The area of opposite side represented by (1,1) on the first side is also represented by (1,1).

The calculation method of the intermediate evaluation values according to the settings of the banknote type-wise reference data 64b shown in FIG. 8 is explained below by using the setting example of the intermediate evaluation value calculation parameters of the banknote type-wise reference data 64b shown in FIGS. 11A to 11D. For convenience of explanation, the pixel value of an i-th determination area of an image number j is represented as fj(i). f1(i) represents the pixel value of the i-th determination area included in the acquired image data corresponding to the image number "1" shown in the image data 64a of FIG. 7, generated by receiving the reflected light when the first side is irradiated with the red light. f3(i) represents the pixel value of the i-th determination area included in the acquired image data corresponding to the image number "3" shown in the image data 64a of FIG. 7, generated by receiving the reflected light when the first side is irradiated with the violet light. f4(i) represents the pixel value of the i-th determination area included in the acquired image data corresponding to the image number "4" shown in the image data 64a of FIG. 7, generated by receiving the reflected light when the first side is irradiated with the infrared light. f7(i) represents the pixel value of the i-th determination area included in the acquired image data corresponding to the image number "7" shown in the image data 64a of FIG. 7, generated by receiving the transmitted light when the opposite side is irradiated with the violet light. f11(i) represents the pixel value of the i-th determination area included in the acquired image data corresponding to the image number "11" shown in the image data 64a of FIG. 7, generated by receiving the reflected light when the opposite side is irradiated with the violet light. f12(i) represents the pixel value of the i-th determination area included in the acquired image data corresponding to the image number "12" shown in the image data 64a of FIG. 7, generated by receiving the reflected light when the opposite side is irradiated with the infrared light.

FIG. 11A shows a setting example of the intermediate evaluation value calculation parameters of the banknote type-wise reference data 64b. This example is a case where there are six intermediate evaluation values. For the calculation of the first intermediate evaluation value, the number of images to be used is one, the IR ratio to be used or not is set as "use", and the coefficient is set as "a". The calculation formula for the first intermediate evaluation value is as shown in FIG. 11B. Because the image number "4" corresponds to the infrared light irradiation image of the image number "1", the first intermediate evaluation value is calculated by adding the values calculated by f1(i)÷f4(i) corresponding to all the determination areas and multiplying the obtained sum by the coefficient a.

For the calculation of the third intermediate evaluation value, the number of images to be used is two, the calculation method is specified as "g1+g2", the IR ratio to be used or not is set as "use", and the coefficient is set as "c". The calculation formula for the third intermediate evaluation value is as shown in FIG. 11C. Because the image number "4" corresponds to the infrared light irradiation image of the image number "3", and the image number "12" corresponds to the infrared light irradiation image of the image number "11", the third intermediate evaluation value is calculated by adding the values calculated by f3(i)÷f4(i)+f11(i)÷f12(i) corresponding to all the determination areas and multiplying the obtained sum by the coefficient c.

For the calculation of the sixth intermediate evaluation value, the number of images to be used is one, the IR ratio to be used or not is set as "not use", and the coefficient is set as "f". The calculation formula for the sixth intermediate evaluation value is as shown in FIG. 11D. The sixth intermediate evaluation is calculated by adding the pixel value f7(i) corresponding to all the determination areas and multiplying the obtained sum by the coefficient f.

A process procedure of the degree of soiling determination process of the banknote according to the present embodiment performed by the banknote processing apparatus 10 shown in FIG. 2 is explained next. FIG. 12 is a flowchart of the process procedure of the degree of soiling determination process of the banknote according to the present embodiment performed by the banknote processing apparatus 10.

When the banknote is transported and brought to the line sensor 21, the image data acquiring unit 60a controls the transport unit driving mechanism 19 and the line sensor 21 to acquire the 12 types of images and write them to the image data 64a (Step S101). The denomination and orientation recognition unit 60b uses the image data 64a acquired at Step S101 to recognize the issuing country of the transported banknote, the banknote denomination, and the orientation in which the banknote is inputted in the banknote processing apparatus 10, and stores the recognition result in the banknote determination result of the evaluation value data 64c (Step S102).

The intermediate evaluation value calculating unit 60c specifies the intermediate evaluation value calculation parameters corresponding to the recognized banknote denomination and banknote orientation, based on the recognition result obtained at Step S102 and the banknote type-wise reference data 64b, and registers the number of intermediate evaluation values in the evaluation value data 64c (Step S103). The intermediate evaluation value calculating unit 60c then calculates one of the uncalculated intermediate evaluation values specified in the intermediate evaluation value calculation parameters specified at Step S103, and registers the calculated intermediate evaluation value in the evaluation value data 64c (Step S104). If there are uncalculated intermediate evaluation values in the intermediate evaluation value calculation parameters specified at Step S103 (Yes at Step S105), the process returns to Step S104.

If there are no more uncalculated intermediate evaluation values specified in the intermediate evaluation value calculation parameter specified at Step S103 (No at Step S105), the final evaluation value calculating unit 60d calculates, by using the intermediate evaluation value registered in the evaluation value data 64c calculated at Step S104 and the final evaluation value calculation parameters of the banknote type-wise reference data 64b, the Mahalanobis distance for the plural intermediate evaluation values as the final evaluation value, and registers the calculated Mahalanobis distance in the evaluation value data 64*c* as the final evaluation value (Step S106).

The soiling determining unit 60*e* compares the final evaluation value calculated and registered in the evaluation value data 64*c* at Step S106 and the determination threshold value specified by the recognition result at Step S102 and the banknote type-wise reference data 64*b* (Step S107). If the final evaluation value is greater than or equal to the determination threshold value (Yes at Step S107), the soiling determining unit 60*e* determines that the banknote is unfit, registers "unfit" in the soiling determination result in the evaluation value data 64*c* (Step S108), and ends the process. If the final evaluation value is less than the determination threshold value (No at Step S107), the soiling determining unit 60*e* determines that the banknote is not unfit, registers the soiling determination result as "not unfit" in the evaluation value data 64*c* (Step S109), and ends the process.

As explained above, the banknote is irradiated with the red light, the green light, the violet light, and the infrared light, the reflected light from the banknote is received, the image for the wavelength of each irradiating light is obtained, and the banknote issuing country, the banknote denomination, and the banknote orientation are recognized based on the obtained images. Furthermore, the ratio image that has a pixel value that refers to the ratio of the pixel value of the received-light data received by irradiation with the visible light to the pixel value of the received-light data received by irradiation with the infrared light is generated. The intermediate evaluation values are then calculated for each wavelength of the irradiating light by using the information pertaining to the banknote issuing country, the banknote denomination, and the banknote orientation, the coefficient corresponding to the wavelength of the irradiating visible light, and the generated ratio image. The Mahalanobis distance for the intermediate evaluation values of the test target banknote is calculated based on thus calculated intermediate evaluation values, the average value and the variance-covariance matrix of those intermediate evaluation values, and the degree of soiling is determined based on this Mahalanobis distance. Consequently, the reliability of determining the degree of soiling of banknotes is improved and the degree of soiling determination can be performed for a large variety of banknotes.

The visible light with which the banknote is irradiated in the above embodiment are the red light, the green light, and the violet light; however, the visible light is not limited to those mentioned above. A blue light, for example, can be used instead of the violet light. Moreover, lights of other wavelengths can be used depending on the optical properties of the degree of soiling determination target banknote.

The configuration of the embodiment shown with reference to the drawings is merely a functional concept; the embodiment does not necessarily have to be physically configured as shown in the drawings. That is, the separation/integration of the apparatus is not limited to what is shown in the drawings. Some or all of the apparatus can be functionally or physically separated/integrated arbitrarily as required in accordance with load and usage conditions.

The banknote processing apparatus and the banknote processing method according to the present invention are useful for improving the reliability of degree of soiling determination of banknotes and can be applied for performing degree of soiling determination for a large variety of banknotes.

To solve the above problems and to achieve the above object, according to an aspect of the present invention, a banknote processing apparatus that performs an unfit note determination that is a determination of a degree of soiling of a banknote being transported, and performs sorting in accordance with a determination result, includes a banknote receiving unit that receives the banknote; a transport unit that transports the banknote received by the banknote receiving unit to one of plural output destination units; an image acquiring unit that, during the transportation of the banknote by the transport unit, irradiates the banknote with lights of plural wavelengths, and based on received light data of at least one of a reflected light that is reflected by the banknote and a transmitted light that passes through the banknote, acquires an image of the banknote for the light of each wavelength that is irradiated; an identifying unit that identifies a type of the banknote received by the banknote receiving unit and a banknote orientation that refers to an orientation of the banknote relative to a transport direction in which the transport unit transports the banknote; and an unfit note determining unit that applies coefficients to the images acquired by the image acquiring unit according to an identification result of the identification unit and the wavelengths of the lights used for irradiation, and performs an unfit note determination that refers to a degree of soiling determination.

According to another aspect of the present invention, in the banknote processing apparatus, the image acquiring unit irradiates the banknote with visible light of the wavelengths of at least one or more of a green light and a red light, and at least one of a violet light and a blue light, and acquires the image of the banknote for the light of each wavelength that is irradiated.

According to still another aspect of the present invention, in the banknote processing apparatus, the image acquiring unit treats an image that has a pixel value that is a ratio of a pixel value of the received light data received by irradiating the banknote with plural visible lights to a pixel value of the received light data received by irradiating the banknote with an infrared light as the image of the banknote for each wavelength of the visible light that is irradiated.

According to still another aspect of the present invention, in the banknote processing apparatus, the unfit note determining unit holds therein, for each of the banknote types and the banknote orientations identified by the identifying unit, a type of the image to be used for the unfit note determination, an area of the image to be used in the determination for each image type to be used in the unfit note determination, and evaluation value calculation parameters for calculating evaluation values from the image corresponding to the area, and determines the degree of soiling based on the evaluation values calculated by using coefficient applied images obtained by applying the coefficient to the images acquired from the image acquiring unit and the evaluation value calculation parameters.

According to still another aspect of the present invention, the banknote processing apparatus further includes a coefficient determining unit that determines a value of the coefficient according to optical properties that include a color of a base material of the banknote, and a material quality of the base material, a background pattern, and a color tone, for each of the banknote types and the banknote orientations.

According to still another aspect of the present invention, in the banknote processing apparatus, the unfit note determining unit holds therein, for each of the banknote types and the banknote orientations identified by the identifying unit, a threshold value that serves as a reference for evaluation of the evaluation values calculated based on the evaluation value calculation parameters, calculates the evaluation values of the banknote based on the coefficient applied image and the evaluation value calculation parameters, and performs the degree of soiling determination by comparing the evaluation value and the threshold value.

According to still another aspect of the present invention, in the banknote processing apparatus, the evaluation value calculation parameters held by the unfit note determining unit include, for each image type to be used in the degree of soiling determination of the banknote, the intermediate evaluation value calculation parameters for calculating the intermediate evaluation value for each image type used in the determination and an average and a variance-covariance matrix of the respective intermediate evaluation values, the unfit note determining unit calculates the intermediate evaluation values corresponding to each coefficient applied image for the light of each wavelength that is irradiated, calculates a Mahalanobis distance of the intermediate evaluation values from the intermediate evaluation values and the average and the variance-covariance matrix of the intermediate evaluation values included in the evaluation value calculation parameters, and performs the unfit note determination of the banknote based on the Mahalanobis distance.

According to still another aspect of the present invention, in the banknote processing apparatus, the coefficient determining unit calculates a multiplier to serve as the coefficient value that is used to correct the pixel value of the images acquired by the image acquiring unit to the same level, based on the image acquired for each wavelength, for each of the banknote types and the banknote orientations, by irradiating the banknote with lights of plural wavelengths.

According to still another aspect of the present invention, a banknote processing method for performing an unfit note determination that is a determination of a degree of soiling of a banknote being transported and sorting in accordance with a checking result, includes receiving the banknote; transporting the banknote received at the receiving; acquiring, based on received light data of at least one of a reflected light that is reflected by the banknote and a transmitted light that passes through the banknote, an image for a light of each wavelength that is irradiated, by irradiating the banknote received at the receiving with the lights of plural wavelengths; identifying a type of the banknote received at the receiving and a banknote orientation that refers to an orientation of the banknote relative to a transport direction at transporting; determining an unfit note by determining a degree of soiling by applying to the images acquired at acquiring a coefficient according to an identification result obtained at the identifying and the wavelengths of the lights used for irradiation; and transporting the banknote to any one of plural output destination units in accordance with an unfit note determination result obtained at the determining.

According to the present invention, the banknote is received; the received banknote is transported to any one of plural output destination units; while transporting the banknote, the banknote is irradiated with the lights of plural wavelengths; an image for a light of each wavelength is acquired based on received light data of at least one of a reflected light that is reflected by the banknote and a transmitted light that passes through the banknote; a type of the received banknote and a banknote orientation that refers to an orientation of the received banknote relative to a transport direction are identified; and whether the banknote is fit or unfit is determined by determining a degree of soiling by applying to the acquired images a coefficient according to the obtained identification result and the wavelengths of the lights used for irradiation. As a result, the reliability of degree of soiling determination of banknotes can be improved and degree of soiling determination can be performed for a large variety of banknotes.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching of the claims.

What is claimed is:

1. A banknote processing apparatus that performs an unfit note determination to determine degree of soiling of a banknote being transported, and sorts the banknote in accordance with a determination result, the banknote processing apparatus comprising:
    a banknote receiving unit that receives the banknote;
    a transport unit that transports the banknote received by the banknote receiving unit to one of plural output destination units in accordance with a result of the unfit note determination;
    an image acquiring unit that irradiates the banknote being transported by the transport unit with light of a predetermined wavelength, and acquires an image of the banknote; and
    an unfit note determining unit that performs the unfit note determination based on the image acquired by the image acquiring unit
    wherein an image type, a determination area and a coefficient to be used for the unfit note determination are previously set for each banknote orientation of each banknote type, and
    the unfit note determining unit
    identifies, based on the banknote type and the banknote orientation of the banknote, the image type to be used for the unfit note determination, the determination are to be used for the image type, and the coefficient for the determination area,
    calculates an intermediate determination value from the image of an identified image type by applying an identified coefficient to a value calculated from pixel values of pixels in an identified determination area, and
    determines the degree of soiling of the banknote by using the intermediate determination value.

2. The banknote processing apparatus according to claim 1, wherein the image acquiring unit irradiates the banknote with a green light, a red light, and at least one of a violet light and a blue light, and acquires the image of each wavelength.

3. The banknote processing apparatus according to claim 1, wherein the unfit note determining unit calculates a ratio of the pixel values of pixels in the determination area of the image acquired by irradiating the banknote with a visible light to pixel values in the same determination area of the image acquired by irradiating the banknote with an infrared light, and
    obtains the intermediate determination value by applying the coefficient to the ratio.

4. The banknote processing apparatus according to claim 1, further comprising:
    a storage unit that stores therein, for each of banknote types and banknote orientations, evaluation value calculation parameters including at least one image type, at least one determination area in the image of each image type and at least one coefficient corresponding to each determination area.

5. The banknote processing apparatus according to claim 4,
wherein the storage unit further stores at least one threshold value therein for each of the banknote types and the banknote orientations, and
the unfit note determining unit determines the degree of soiling of the banknote by calculating a final evaluation value from the intermediate determination value and comparing the final evaluation value to the threshold value stored in the storage unit.

6. The banknote processing apparatus according to claim 4,
wherein the evaluation value calculation parameters include, for each of the image types to be used in the unfit note determination, intermediate evaluation value calculation parameters for calculating the intermediate evaluation value, and an average and a variance-covariance matrix of the respective intermediate evaluation values, and
the unfit note determining unit, based on the intermediate evaluation value calculation parameters,
calculates the intermediate evaluation values for each of the images acquired by irradiating light of a plurality of wavelengths,
calculates a Mahalanobis distance of the intermediate evaluation values from the intermediate evaluation values, the average to the variance-covariance matrix, and
performs the unfit note determination based on the Mahalanobis distance.

7. A banknote processing method for performing an unfit note determination to determine degree of soiling of a banknote being transported, and sorting the banknote in accordance with a determination result by the banknote processing apparatus, the banknote processing method comprising:
receiving the banknote;
transporting the banknote received at the receiving;
acquiring an image of the banknote by irradiating the banknote being transported with light of a predetermined wavelength;
identifying an image type to be used for the unfit note determination, a determination area to be used for each of the image types, and a coefficient for the determination area based on a banknote type and a banknote orientation of the banknote, the image type, the determination area and the coefficient having been previously set for each banknote orientation of each banknote type;
calculating intermediate determination value from the image of an identified image type by applying an identified coefficient to a value calculated from pixel values of pixels in an identified determination area;
performing the unfit note determination based on the intermediate value; and
transporting the banknote to any one of plural output destination units in accordance with a result of the unfit note determination.

8. The banknote processing method according to claim 7, further comprising:
determining a value of the coefficient according to optical properties of the banknotes that include a color of a substrate, and a material quality of the substrate, a background pattern, and a color tone, for each of the banknote types and the banknote orientations.

9. The banknote processing method according to claim 8, wherein a multiplier used for correcting the pixel values of images obtained by irradiating Rail the banknote with visible lights of different wavelengths to the same level between the images is calculated as the value of the coefficient for correcting each of the images,
the images are acquired for each of the banknote types, the banknote orientations, and wavelengths, by irradiating the banknote with the visible lights of different wavelengths in the image acquiring.

* * * * *